(12) United States Patent
Miyamoto et al.

(10) Patent No.: US 7,330,302 B2
(45) Date of Patent: Feb. 12, 2008

(54) OPTICAL TRANSMISSION SYSTEM

(75) Inventors: Toshiyuki Miyamoto, Yokohama (JP); Masayuki Shigematsu, Yokohama (JP); Masayuki Nishimura, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 190 days.

(21) Appl. No.: 10/607,380

(22) Filed: Jun. 27, 2003

(65) Prior Publication Data

US 2004/0028416 A1 Feb. 12, 2004

Related U.S. Application Data

(60) Provisional application No. 60/452,492, filed on Mar. 7, 2003.

(30) Foreign Application Priority Data

Jun. 28, 2002 (JP) .......................... P2002-190967
Feb. 28, 2003 (JP) .......................... P2003-054712

(51) Int. Cl.
*H01S 3/00* (2006.01)

(52) U.S. Cl. .................................... 359/334

(58) Field of Classification Search ................. 398/182; 359/334

See application file for complete search history.

(56) References Cited

U.S. PATENT DOCUMENTS

| 4,699,452 A | 10/1987 | Mollenauer et al. ........ 398/157 |
| 5,589,969 A | 12/1996 | Taga et al. .................... 398/91 |
| 5,790,300 A | 8/1998 | Zediker et al. .............. 359/124 |
| 6,205,268 B1 | 3/2001 | Chraplyvy et al. ........... 385/24 |
| 6,263,139 B1 | 7/2001 | Kawakami et al. .......... 385/123 |
| 6,282,002 B1 | 8/2001 | Grubb et al. ................ 398/157 |

(Continued)

FOREIGN PATENT DOCUMENTS

CN 1279549 A 1/2001

(Continued)

OTHER PUBLICATIONS

Yu et al. Optimisation of wavelength spacing in a WDM transmission system in the presence of fibre nonlinearities. IEEE Proc.-Optoelectron., vol. 142, No. 4, Aug. 1995.*

(Continued)

*Primary Examiner*—Deandra M Hughes
(74) *Attorney, Agent, or Firm*—McDermott Will & Emery LLP

(57) ABSTRACT

This invention provides an optical transmission system which allows to perform high-quality transmission of each of a plurality of signal channels multiplexed. In the optical transmission system, signal light in which a plurality of signal channels with an optical frequency spacing of 400 GHz or more but 12.5 THz or less is transmitted from an optical transmitter to a Raman amplifier through an optical fiber transmission line. In the Raman amplifier, pumping light from a pumping light source unit is supplied to an optical fiber through an optical coupler. The multiplexed signal light inputted to the Raman amplifier arrives at the optical fiber through an optical isolator and optical coupler, and Raman-amplified by the optical fiber. The Raman-amplified multiplexed signal light is outputted from the Raman amplifier through an optical coupler and optical isolator.

13 Claims, 24 Drawing Sheets

U.S. PATENT DOCUMENTS

| | | | |
|---|---|---|---|
| 6,292,288 B1* | 9/2001 | Akasaka et al. | 359/334 |
| 6,496,305 B2* | 12/2002 | Spock et al. | 359/349 |
| 6,611,370 B2 | 8/2003 | Namiki et al. | 359/334 |
| 6,646,787 B2 | 11/2003 | Akasaka et al. | 359/334 |
| 6,687,443 B2 | 2/2004 | Kubo et al. | 385/123 |
| 6,693,740 B2 | 2/2004 | Gray et al. | 359/337.4 |
| 6,731,877 B1 | 5/2004 | Cao et al. | 348/91 |
| 6,748,178 B2 | 6/2004 | Miyakawa et al. | 398/148 |
| 6,768,577 B2* | 7/2004 | Eggleton et al. | 359/335 |
| 6,778,322 B2* | 8/2004 | Kakui et al. | 359/334 |
| 6,785,472 B1* | 8/2004 | Adams et al. | 398/79 |
| 6,806,999 B2* | 10/2004 | Tsuzaki et al. | 359/334 |
| 6,823,107 B2* | 11/2004 | Muro et al. | 385/27 |
| 2002/0063948 A1 | 5/2002 | Islam et al. | |
| 2002/0131119 A1* | 9/2002 | Hamoir et al. | 359/134 |
| 2003/0030890 A1* | 2/2003 | Tanaka et al. | 359/334 |
| 2004/0032640 A1 | 2/2004 | Miyamoto et al. | 359/334 |
| 2004/0246566 A1* | 12/2004 | Miyamoto et al. | 359/334 |
| 2005/0117839 A1* | 6/2005 | Avallone et al. | 385/24 |

FOREIGN PATENT DOCUMENTS

| | | |
|---|---|---|
| EP | 1 018 666 A1 | 7/2000 |
| JP | P2000-98433 A | 4/2000 |
| WO | WO 00/49721 | 8/2000 |
| WO | WO 02/17518 A1 | 2/2002 |
| WO | WO 02/29943 A2 | 4/2002 |
| WO | WO 02/29943 A3 | 4/2002 |

OTHER PUBLICATIONS

Agrawal et al. Fiber Optic Communication Systems. John Wiley & Sons, Inc. May 28, 2002. pp. 420-422.*

Reed, William. "Fiber Fabrication, Properties, and Measurement." Lucent/Bell labs, USA, Wednesday Morning/OFC2002. pp. 171-172. 2002.*

Agrawal, Govind. Fiber-Optic Communication Systems. 3rd Edition. Wiley-Interscience. 2002. pp. 246-250.*

Emori, Y., et al., "100 nm bandwidth flat-gain Raman amplifiers pumped and gain-equealised by 12-wavelength-channel WDM laser diode unit" Electronics Letters, Aug. 5, 1999, vol. 35 No. 16, IEE.

Partial European Search Report issued in European Patent Application No. EP 03 01 4412, dated May 4, 2007.

European Search Report issued in European Patent Application No. EP 03 01 4412, dated Jul. 3, 2007.

Krummrich, P.M., et al., "Bandwidth limitations of broadband distributed Raman fiber amplifiers for WDM systems", 2000, pp. MI3-1-MI3-3, XP010546035, Optical Society of America.

Chinese Office Action issued in corresponding Chinese Patent Application No. CN 031485049, dated Aug. 18, 2006.

* cited by examiner

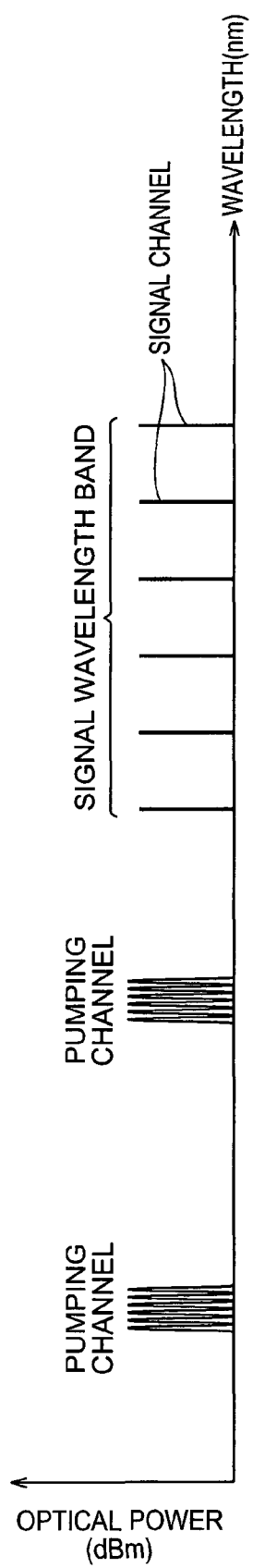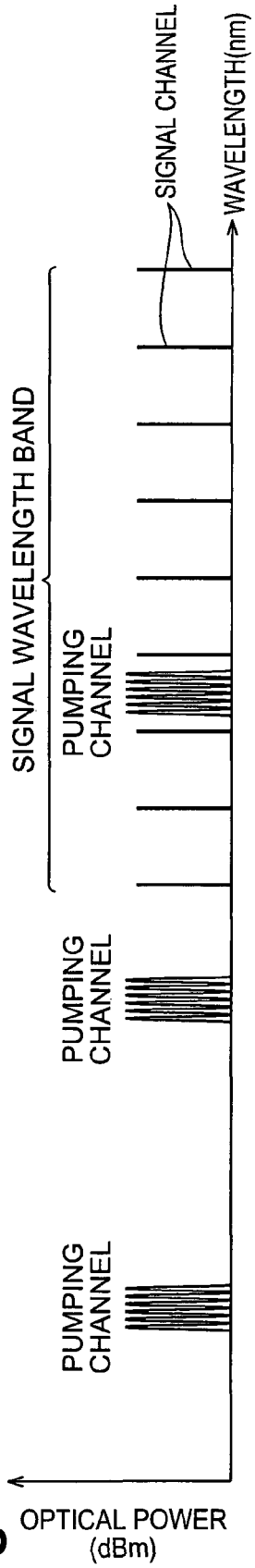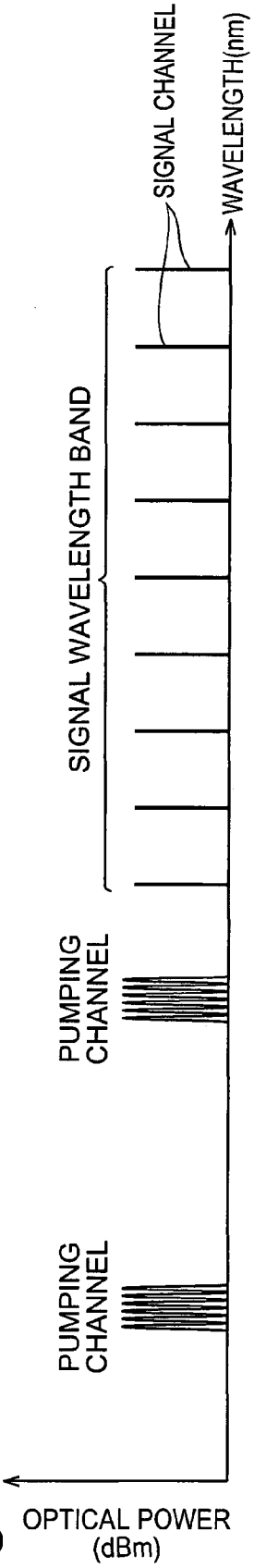

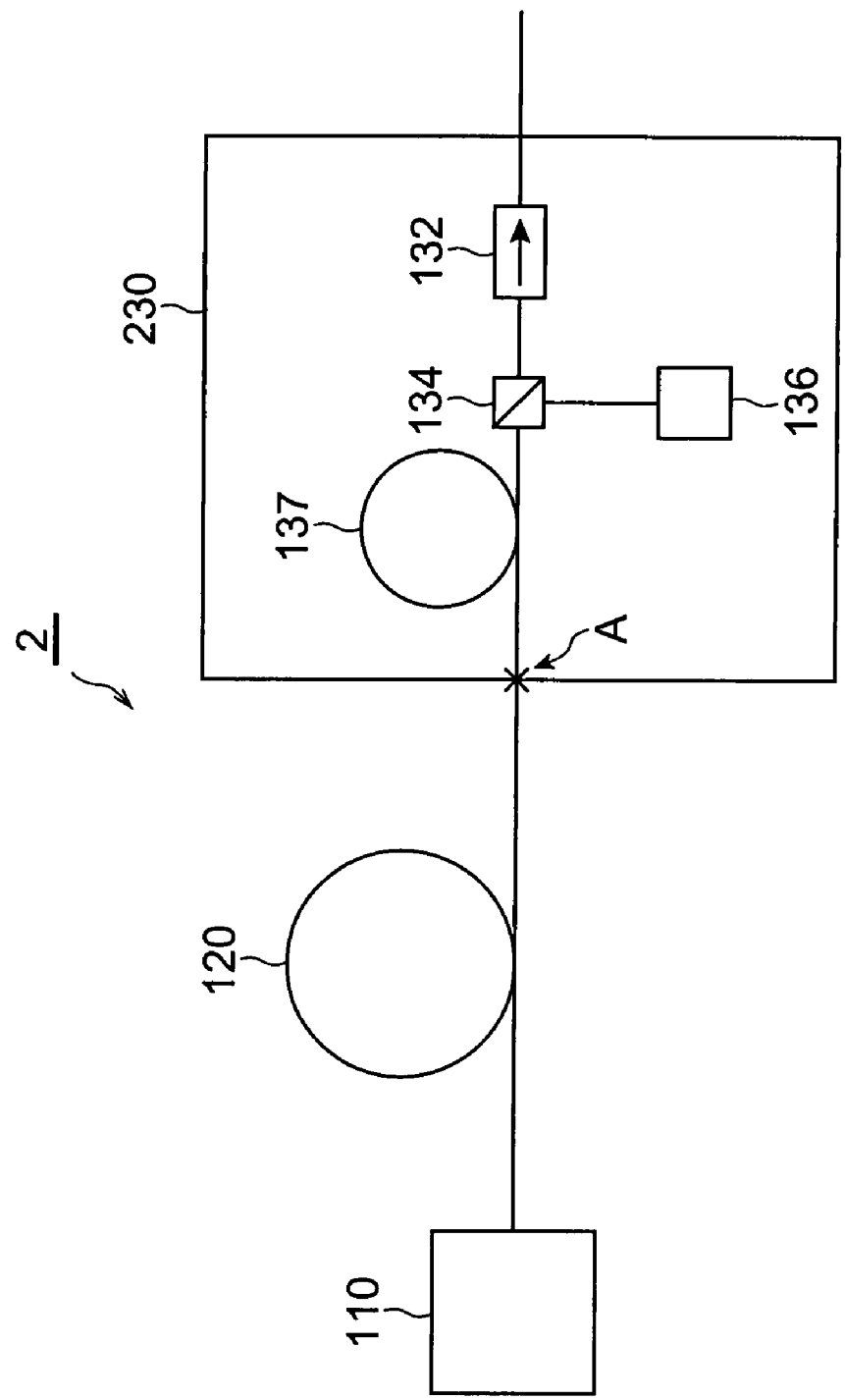

*Fig.12*

| PUMPING DIRECTION | WAVELENGTH (nm) | POWER (mW) |
|---|---|---|
| FORWARD | 1360 | 211.6 |
| BACKWARD | 1360 | 613.8 |
| | 1390 | 235.5 |
| | 1405 | 11.2 |
| | 1430 | 11.4 |
| | 1460 | 6.6 |
| | 1500 | 23.8 |

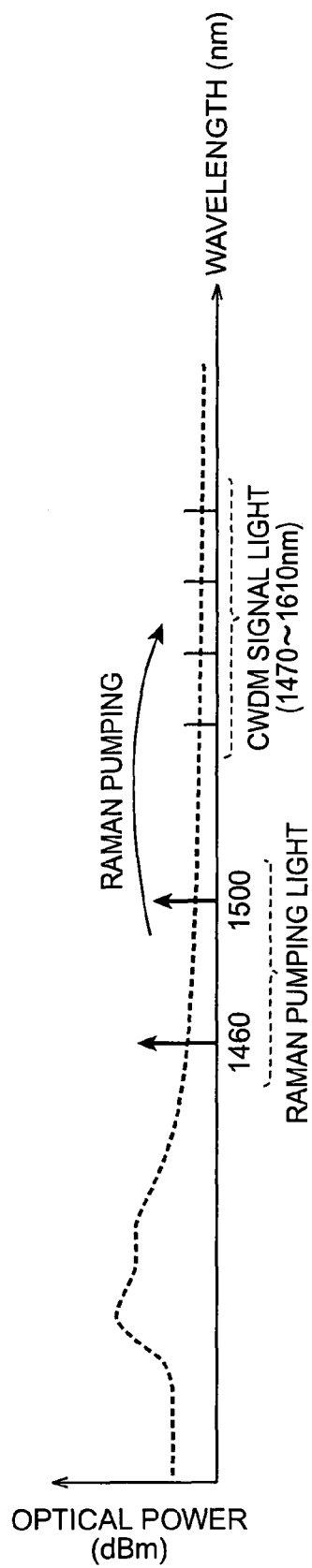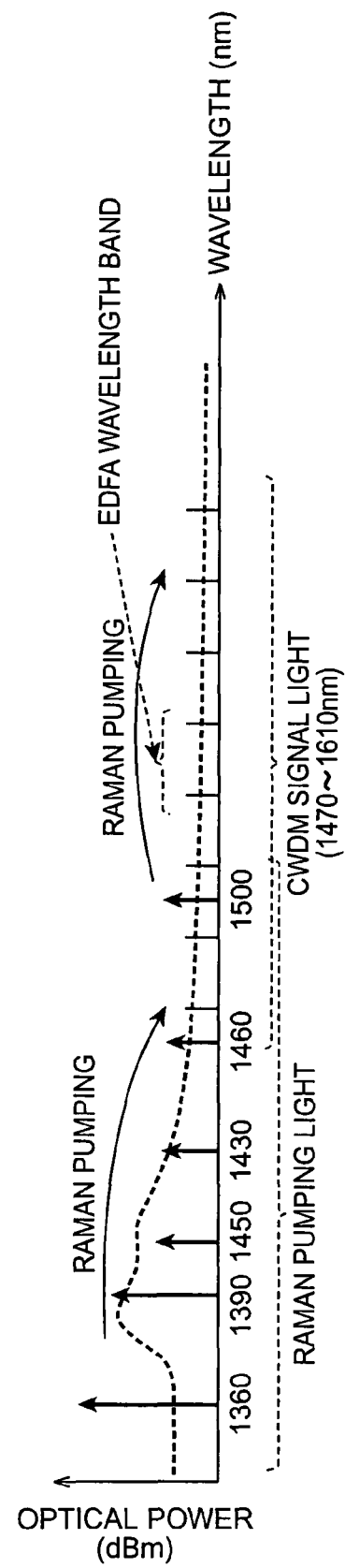

| WAVE LENGTH OF SIGNAL LIGHT (nm) (CHANNEL SPACING:20nm) | WAVELENGTH OF PUMPING LIGHT (nm) |
|---|---|
| 1470~1530 | 1387.5, 1427.5 |
| 1550~1610 | 1457.5, 1500 |
| 1510~1570 | 1422.5, 1465 |

OPTICAL TRANSMISSION SYSTEM

CROSS-REFERENCE TO RELATED APPLICATION

This application claims priority to Provisional Application Serial No. 60/452,492 filed on Mar. 7, 2003, which is hereby incorporated by reference in its entirety.

BACKGROUND OF THE INVENTION

1. Field of the Invention

The present invention relates to an optical transmission system which transmits signal light in which a plurality of signal channels with optical frequencies different from each other are multiplexed.

2. Related Background Art

A wavelength division multiplexing (WDM) optical transmission system is an optical system which transmits, through an optical fiber transmission line, signal light (WDM signal light) in which a plurality of signal channels with optical frequencies different from each other are multiplexed. The WDM optical transmission system can transmit/receive a large quantity of information at a high speed. For the optical transmission system as a backbone network with a great demand for communication, a further increase in capacity has been examined by reducing the optical frequency spacing of a plurality of signal channels to increase the degree of multiplexing. WDM with a higher degree of multiplexing is called a DWDM (Dense WDM).

On the other hand, in an optical transmission system with not so large demand for communication, the degree of multiplexing is decreased by increasing the optical frequency spacing of a plurality of signal channels, thereby reducing the system cost. WDM with a lower degree of multiplexing is called a CWDM (Coarse WDM). In a CWDM optical transmission system, as the number of signal channels in signal light decreases, the number of optical components (e.g., signal light sources, light-receiving elements, and the like) is reduced. In addition, inexpensive optical components (e.g., optical multiplexers, optical demultiplexers, and the like) whose wavelength accuracy requirement values are small because of the large optical frequency spacing are used. Accordingly, the system cost can be reduced.

SUMMARY OF THE INVENTION

The present inventors have studied the conventional optical transmission system and found the following problem. In the conventional CWDM optical transmission system, since the optical frequency spacing of signal channels is large, the signal wavelength band containing each signal channel is wide. The bandwidth may be as large as, e.g., about 100 nm. When the bandwidth is as large as about 100 nm, the optical characteristics (e.g., transmission loss, chromatic dispersion, and the like) of an optical fiber transmission line on the short wavelength side in the signal wavelength band are largely different from those on the long wavelength side. Hence, it is difficult for the conventional CWDM optical transmission system to uniformly maintain the transmission quality of each signal channel contained in the signal wavelength band.

The present invention has been made to solve the above-described problem, and has as its object to provide an optical transmission system having a structure capable of guaranteeing high-quality transmission for each of a plurality of signal channels.

An optical transmission system according to the present invention is a CWDM optical transmission system which transmits, through an optical fiber transmission line, signal light (WDM signal) in which a plurality of signal channels are multiplexed and comprises a structure for guaranteeing a high transmission quality of each signal channel of the signal light. More specifically, the optical transmission system according to the present invention comprises a transmitter which outputs signal light in which a plurality of signal channels with an optical frequency spacing of 400 GHz or more but 12.5 THz or less are multiplexed, an optical fiber transmission line which transmits the signal light, and Stimulated-Raman-Scattering (SRS) means which Raman-amplifies the signal light by supplying Raman amplification pumping light. This SRS means includes part of the optical fiber transmission line as an optical fiber for Raman amplification. The wavelength spacing of the signal channels contained in the signal light is preferably 10 nm or more.

In the optical transmission system according to the present invention, the SRS means may be a lumped amplifier that includes an optical fiber for Raman amplification that constitutes part of the optical fiber transmission line. In this case, to use a transmission line section of the transmission line section, which is located outside the lumped Raman amplifier, also as the optical fiber for Raman amplification (in this case, the SRS means also functions as a distributed Raman amplifier), the lumped Raman amplifier preferably has a structure which guides excess Raman amplification pumping light to the external transmission line section. The SRS means is preferably arranged at least at one of the transmission end and reception end of the signal light in the optical fiber transmission line. In either case, high-gain Raman amplification can be performed.

In the optical transmission system according to the present invention, of the optical fiber transmission line, at least a transmission line section which functions as the optical fiber for Raman amplification preferably includes an optical fiber with a negative chromatic dispersion in a wavelength band containing the signal light. Generally, an optical fiber transmission line has positive chromatic dispersion. The chromatic dispersion is compensated for by the optical fiber included in the SRS means, and high-quality signal transmission can be performed.

In the optical transmission system according to the present invention, of the optical fiber transmission line, at least a transmission line section which functions as the optical fiber for Raman amplification may include an optical fiber with a loss peak of 0.33 dB/km or less due to OH-radicals near a wavelength of 1.39 µm. In this case, since pumping light near the wavelength of 1.39 µm can be supplied at a high efficiency, the pumping efficiency can be increased, and the gain spectrum can also be improved.

In the optical transmission system according to the present invention, the wavelength of the pumping channel is preferably located between adjacent signal channels of the signal channels contained in the signal light. When the signal channels and pumping channels are arranged in this way, the signal light can be Raman-amplified at a high gain even on the long wavelength side in the signal wavelength band.

In the optical transmission system according to the present invention, the SRS means preferably Raman-amplifies, of the plurality of signal channels contained in the signal light, a signal channel in a wavelength range where a transmission loss in the optical fiber transmission line is a first threshold value or more. The SRS means preferably further comprises a dispersion compensation means which compensates for a chromatic dispersion of a signal channel, of the plurality of signal channels contained in the signal light, in a wavelength range where an accumulated chromatic dispersion in the optical fiber transmission line is a second threshold value or more. In either case, since Raman amplification or dispersion compensation can be executed in a necessary wavelength range in the signal wavelength band, high-quality signal transmission of each signal channel can be performed.

A technique for enabling optical amplification in a wider wavelength band while suppressing a gain variation between signal channels by using a plurality of pumping light sources (LDs) is disclosed in, e.g., Japanese Patent Laid-Open No. 2000-98433. However, in the conventional CWDM optical transmission system, however, since the channel spacing of pumping light is 6 nm or more but 35 nm or less, the gain flatness can hardly be further increased while keeping the number of pumping LDs small.

In the optical transmission system according to the present invention, as a CWDM optical transmission system, Raman amplification in a wider wavelength band can be performed while maintaining the number of light sources small.

More specifically, an optical transmission system according to the present invention comprises a transmitter which outputs a predetermined multiplexed signal, an optical fiber transmission line, and SRS means which Raman-amplifies the signal light. The transmitter outputs signal light in which a plurality of signal channels with an optical frequency spacing of 400 GHz or more but 12.5 THz or less are multiplexed. The optical fiber transmission line is arranged between the transmitter and a receiver and transmits the signal light. The Raman amplifier includes at least part of the optical fiber transmission line as an optical fiber for Raman amplification and also includes a pumping light source which supplies Raman amplification pumping light containing at least one pumping channel multiplexed to part of the optical fiber transmission line.

In particular, in the optical transmission system according to the present invention, an optical frequency of each pumping channel contained in the pumping light is so set as to locate a peak of Raman gain at an optical frequency different from an optical frequency of each signal channel contained in the signal light. More specifically, the optical frequency of the signal channel is lower than that of the pumping channel by 13.2 THz. More specifically, the optical frequency of each pumping channel contained in the pumping light is preferably so set as to locate the peak of Raman gain at an optical frequency separated from the optical frequency of each signal channel contained in the signal light by 624 GHz (5 nm). On the other hand, the optical frequency of each pumping channel contained in the pumping light is preferably so set as to locate the peak of Raman gain at an optical frequency not separated from the optical frequency of each signal channel contained in the signal light by 1,248 GHz (10 nm) or more. Accordingly, in the CWDM optical transmission system, a high gain flatness can be obtained in a wider wavelength band while keeping the number of pumping light sources small.

In the optical transmission system according to the present invention, an optical frequency spacing of the pumping channels contained in the pumping light is preferably 4,680 GHz (37.5 nm) or more. The optical frequency of each of adjacent pumping channels of the pumping channels contained in the pumping light may be so set as to locate the peak of Raman gain at an optical frequency separated from the optical frequency of each signal channel contained in the signal light by 624 GHz or more and not separated by 2,496 GHz (20 nm) or more.

In the optical transmission system according to the present invention, the optical frequency band of the signal light is 12.48 THz (100 nm) or less. The number of pumping channels is determined by the number of signal channels to be used. More specifically, let m be the number of pumping channels of the pumping light, and n be the number of signal channels of the signal light, the number of pumping channels and the number of signal channels satisfy a relation given by $m \leq n/2$, furthermore $m \leq (n+4)/2$.

In the optical transmission system according to the present invention, when a plurality of pumping channels are used, the gain spectrum of the SRS means has peaks of Raman gain with optical frequencies different from each other derived from the pumping channels contained in the pumping light. In this case, the optical frequency of each pumping channel contained in the pumping light is so set as to locate the peaks of Raman gain derived from the pumping channels at optical frequencies different from those of the signal channels contained in the signal light. In other words, a gain spectrum of the SRS means has peaks of Raman gain which are present at a first optical frequency spacing derived from the pumping channels contained in the pumping light, and the optical frequency of each signal channel contained in the signal light is set at a second optical frequency spacing, unlike the peaks of Raman gain derived from the pumping channels.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIGS. 2A to 2C are views for explaining arrangement examples of signal channels and pumping channels;

FIG. 3 is a view showing the arrangement of an optical transmission system according to a second embodiment of the present invention;

FIG. 12 is a table showing the power of each pumping channel used in the experimental system shown in FIG. 11;

FIGS. 13A and 13B are views showing the arrangement of pumping channels and signal channels so as to explain upgrading from lumped Raman amplification for 4-channel signal light to lumped Raman amplification for 8-channel signal light;

DETAILED DESCRIPTION OF THE PREFERRED EMBODIMENTS

Figure 1:
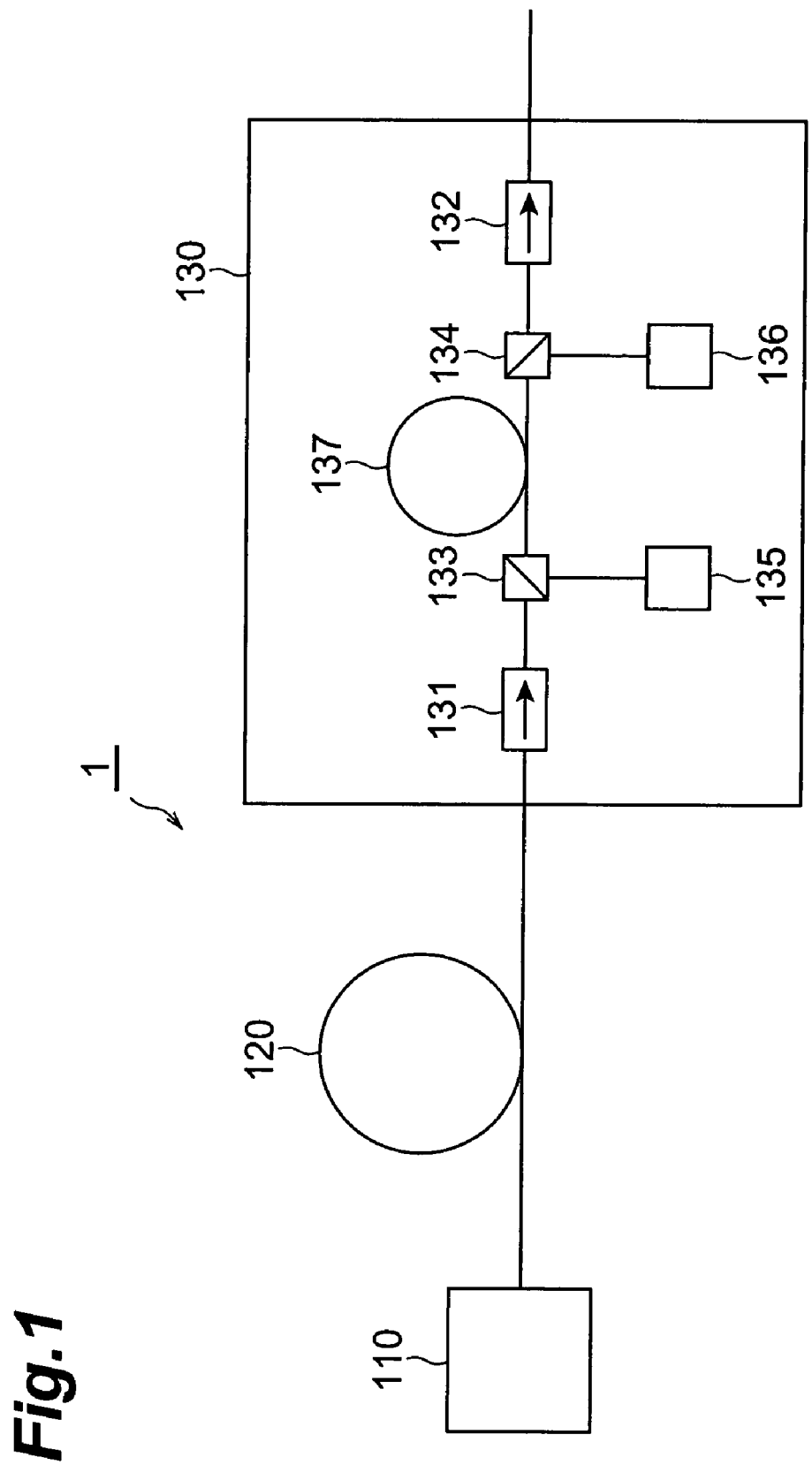
FIG. 1 is a view showing the arrangement of an optical transmission system according to a first embodiment of the present invention.

The embodiments of an optical transmission system according to the present invention will be described below in detail with reference to FIGS. 1, 2A to 2C, 3 to 12, 13A to 16B, and 17 to 27. The same reference numerals denote the same elements throughout the drawings, and a repetitive description thereof will be omitted.

First Embodiment

An optical transmission system according to a first embodiment of the present invention will be described first. FIG. 1 is a view showing the arrangement of an optical transmission system according to the first embodiment of the present invention. An optical transmission system 1 shown in FIG. 1 is a CWDM optical transmission system comprises at least an optical transmitter 110, optical fiber transmission line 120, and lumped Raman amplifier (LRA) 130.

The optical transmitter 110 outputs signal light (WDM signal) in which a plurality of signal channels with an optical frequency spacing of 400 GHz or more but to 12.5 THz or less are multiplexed. The wavelength spacing (channel spacing) of the multiplexed signal light outputted from the optical transmitter 110 is preferably 10 nm or more. As a light source that outputs each signal channel, for example, a distributed feedback laser light source, Fabry-Perot semiconductor laser light source (FP-LD), or a fiber grating laser light source which stabilizes the output wavelength by combining the FP-LD and an optical fiber grating can be used. For modulation of signal light, the light source may be directly modulated, or the signal light may be externally modulated by an external modulator. The light source need not be temperature-adjusted. In CWDM optical transmission, the allowable range of wavelength variation of each signal channel is wide. For this reason, the signal channel wavelength can vary to some extent upon direct modulation or without temperature adjustment.

The optical fiber transmission line 120 transmits multiplexed signal light outputted from the optical transmitter 110 to the Raman amplifier 130. This optical fiber transmission line 120 can be constituted by any one of a standard single-mode optical fiber (SMF) with a zero dispersion wavelength near 1.3 μm, a non-zero dispersion-shifted optical fiber (NZDSF) which has a zero dispersion wavelength on the longer wavelength side than 1.3 μm and a small positive chromatic dispersion at 1.55 μm, a dispersion-shifted optical fiber (DSF) with a zero dispersion wavelength near 1.55 μm, a pure silica glass core optical fiber having a core region substantially comprised of pure silica glass and a cladding region doped with F element, and a single-mode optical fiber with an effective area larger than that of a normal optical fiber. The optical fiber transmission line 120 may be formed by connecting two or more of these optical fibers. Alternatively, the optical fiber transmission line 120 may be formed by connecting one or more of the above optical fibers and a dispersion compensating optical fiber (DCF).

The Raman amplifier 130 receives multiplexed signal light transmitted through the optical fiber transmission line 120 and Raman-amplifies the multiplexed signal light. The. Raman amplifier 130 is preferably arranged at least at one of the transmission end and reception end of the multiplexed signal light. The Raman amplifier 130 has, sequentially from the signal light input end to the signal light output end, an optical isolator 131, optical coupler 133, optical fiber for Raman amplification 137 (the optical fiber for Raman amplification 137 constitutes part of the optical fiber transmission line arranged between the optical transmitter and the optical receiver together with the optical fiber transmission line 120), optical coupler 134, and optical isolator 132. The Raman amplifier 130 also has a pumping light source unit 135 connected to the optical coupler 133 and a pumping light source unit 136 connected to the optical coupler 134.

Each of the optical isolators 131 and 132 passes light in the forward direction from the signal light input end to the signal light output end but does not pass light in the reverse direction. Each of the pumping light source units 135 and 136 outputs pumping light to Raman-amplify signal light in the optical fiber 137. The optical coupler 133 outputs pumping light that has arrived from the pumping light source unit 135 to the optical fiber 137 in the forward direction and also outputs signal light that has arrived from the optical isolator 131 to the optical fiber 137. The optical coupler 134 outputs pumping light that has arrived from the pumping light source unit 136 to the optical fiber 137 in the reverse direction and also outputs signal light that has arrived from the optical fiber 137 to the optical isolator 132.

As each of the pumping light source units 135 and 136, for example, a Fabry-Perot semiconductor laser light source (FP-LD), a fiber grating laser light source which stabilizes the output wavelength by combining the FP-LD and an optical fiber grating, or a Raman laser light source can be used. When each of the pumping light source units 135 and 136 includes a light source having a dependence on polarization, the pumping light source unit preferably includes an optical polarization synthesizer which polarizes and synthesizes the pumping light outputted from the light source. Each pumping light source unit may include a depolarizer which depolarizes the pumping light outputted from the light source.

The optical fiber for Raman amplification 137 Raman-amplifies the multiplexed signal light upon receiving Raman amplification pumping light. When the optical fiber 137 is a silica-based optical fiber, the pumping light frequency is lower than the signal light frequency by about 13.2 THz, and the pumping light wavelength is shorter than the signal light wavelength by about 100 nm. Generally, a silica-based optical fiber has a loss peak of about 0.40 dB/km due to OH-radicals near a wavelength of 1.39 μm. The optical fiber 137 applied to this embodiment preferably has a loss peak of 0.33 dB/km or less due to OH-radicals near a wavelength of 1.39 μm. When the loss peak is small, the Raman amplification pumping light near 1.39 μm propagates through the optical fiber 137 with a small loss, so a satisfactory Raman amplification gain can be obtained.

Let $P_p$ be the input power of pumping light, L be the length of the optical fiber for Raman amplification, $\alpha_s$ be the transmission loss of the optical fiber at the signal light wavelength, $\alpha_p$ be the transmission loss of the optical fiber at the pumping light wavelength, $g_R$ be the Raman gain coefficient of the optical fiber, and $A_{eff}$ be the effective area of the optical fiber. An ON/OFF gain $G_{on\text{-}off}$ and net gain $G_{net}$ obtained by Raman amplification in the optical fiber are given by $$G_{on\text{-}off} = \exp(L_{eff} P_p g_R / A_{eff}) \quad (1a)$$

$$G_{net} = \exp(L_{eff} P_p g_R / A_{eff} - \alpha_s L) \quad (1b)$$

for $$L_{eff} = (1 - \exp(-\alpha_p L))/\alpha_p \quad (1c)$$

where $L_{eff}$ is the effective length of the optical fiber.

As is apparent from these equations, when the loss $\alpha_p$ is decreased, the gain can be increased. When pumping light with a wavelength near 1.39 μm is used, it is effective to decrease the loss peak due to OH-radicals. When the loss peak due to OH-radicals near 1.39 μm is decreased from 0.40 dB/km at normal level to 0.33 dB/km or less, the effective length $L_{eff}$ of the optical fiber can be increased from 2.50 km to 3.03 km, so the pumping efficiency increases by about 20%.

In addition, the optical fiber for Raman amplification 137 preferably compensates for the chromatic dispersion of the optical fiber transmission line 120. Generally, an optical fiber used as an optical fiber transmission line is a standard single-mode optical fiber or dispersion-shifted optical fiber and has a positive chromatic dispersion at 1.55 μm in the signal wavelength band. In addition, generally, signal light directly modulated and outputted from a laser diode used as a signal light source has a positive chromatic dispersion. Hence, the optical fiber for Raman amplification 137 preferably has a negative chromatic dispersion at 1.55 μm. This reduces the degradation in waveform of signal light due to accumulated chromatic dispersion, so high-quality signal transmission can be performed. A dispersion compensator may be arranged independently of the optical fiber 137.

FIGS. 2A to 2C are views for explaining the channel arrangement of signal light and pumping light. In the channel arrangement shown in FIG. 2A, the width of the signal wavelength band containing all signal channels (six channels in FIG. 2A) is 100 nm or less, and all pumping channels are present on the shorter wavelength side than the signal wavelength band. The pumping channels are preferably separated by 35 nm or more. In the channel arrangement shown in FIG. 2B, pumping channels are present not only on the shorter wavelength side than the signal wavelength band containing all signal channels but also between adjacent signal channels in the signal wavelength band. When the pumping channels are arranged between adjacent signal channels, multiplexed signal light can efficiently be Raman-amplified over a wide band. In addition, the gain spectrum in the signal wavelength band can have a desired shape. In the channel arrangement shown in FIG. 2C, the width of the signal wavelength band containing all signal channels is 100 nm or more, and all pumping channels are present on the shorter wavelength side than the signal wavelength band. Even in this case, since Raman amplification need not be performed (or the gain can be small) on the long wavelength side where the transmission loss is generally small in the signal wavelength band, high-quality CWDM optical transmission can be performed. Referring to FIGS. 2A to 2C, each pumping channel contains a plurality of longitudinal modes. However, a laser beam with a small line width may be used.

In the optical transmission system 1, signal light in which a plurality of signal channels with an optical frequency spacing of 400 GHz or more but 12.5 THz or less are multiplexed is outputted from the optical transmitter 110, propagates through the optical fiber transmission line 120, and arrives at the Raman amplifier 130. In the Raman amplifier 130, pumping light components outputted from the pumping light source units 135 and 136 are supplied to the optical fiber 137 through the optical couplers 133 and 134. The multiplexed signal light that has arrived at the Raman amplifier 130 passes through the optical isolator 131 and optical coupler 133 and arrives at the optical fiber 137. In the optical fiber 137, the multiplexed signal light is Raman-amplified. The Raman-amplified signal light passes through the optical coupler 134 and optical isolator 132 and is outputted from the Raman amplifier 130. The band width and shape of the gain spectrum in the Raman amplifier 130 can be set relatively freely. For this reason, even when the signal wavelength band is wide, CWDM optical transmission of each signal channel of the multiplexed signal light can be performed at a high quality.

Second Embodiment

An optical transmission system according to a second embodiment of the present invention will be described next. FIG. 3 is a view showing the arrangement of an optical transmission system according to the second embodiment of the present invention. An optical transmission system 2 shown in FIG. 3 is a CWDM optical transmission system comprises an optical transmitter 110, optical fiber transmission line 120, and lumped Raman amplifier 230. The optical transmission system 2 according to the second embodiment is different from the optical transmission system 1 according to the first embodiment described above in the Raman amplifier 230 is arranged in place of the Raman amplifier 130.

The Raman amplifier 230 according to the second embodiment has, sequentially from the signal light input end to the signal light output end, an optical fiber for Raman amplification 137 (the optical fiber for Raman amplification 137 constitutes part of the optical fiber transmission line arranged between the optical transmitter and the optical receiver together with the optical fiber transmission line), optical coupler 134, and optical isolator 132. The Raman amplifier 230 also has a pumping light source unit 136 connected to the optical coupler 134. The Raman amplifier 230 corresponds to an arrangement obtained by removing the optical isolator 131, optical coupler 133, and pumping light source unit 135 from the Raman amplifier 130 according to the first embodiment.

In the optical transmission system 2, the Raman amplifier 230 has a structure for not only supplying pumping light outputted from the pumping light source unit 136 to the optical fiber 137 through the optical coupler 134 but also supplying excess pumping light from the Raman amplifier 230 to the optical fiber transmission line 120 located outside (this corresponds to a fusion-spliced point A between the optical fiber transmission line 120 and optical fiber 137 in FIG. 3). That is, the optical transmission system 2 has, as SRS means, a distributed Raman amplifier (DRA) constituted by the optical fiber transmission line 120, optical coupler 134, and pumping light source unit 136 as well as the lumped Raman amplifier 230. Hence, multiplexed signal light outputted from the optical transmitter 110 is Raman-amplified even during propagation through the optical fiber transmission line 120 and also Raman-amplified by the Raman amplifier 230.

In the second embodiment, since pumping light is also supplied to the optical fiber transmission line 120, not only the optical fiber 137 but also the optical fiber transmission line 120 preferably has a loss peak of 0.33 dB/km or less due to OH-radicals near a wavelength of 1.39 μm.

Third Embodiment

Figure 4:
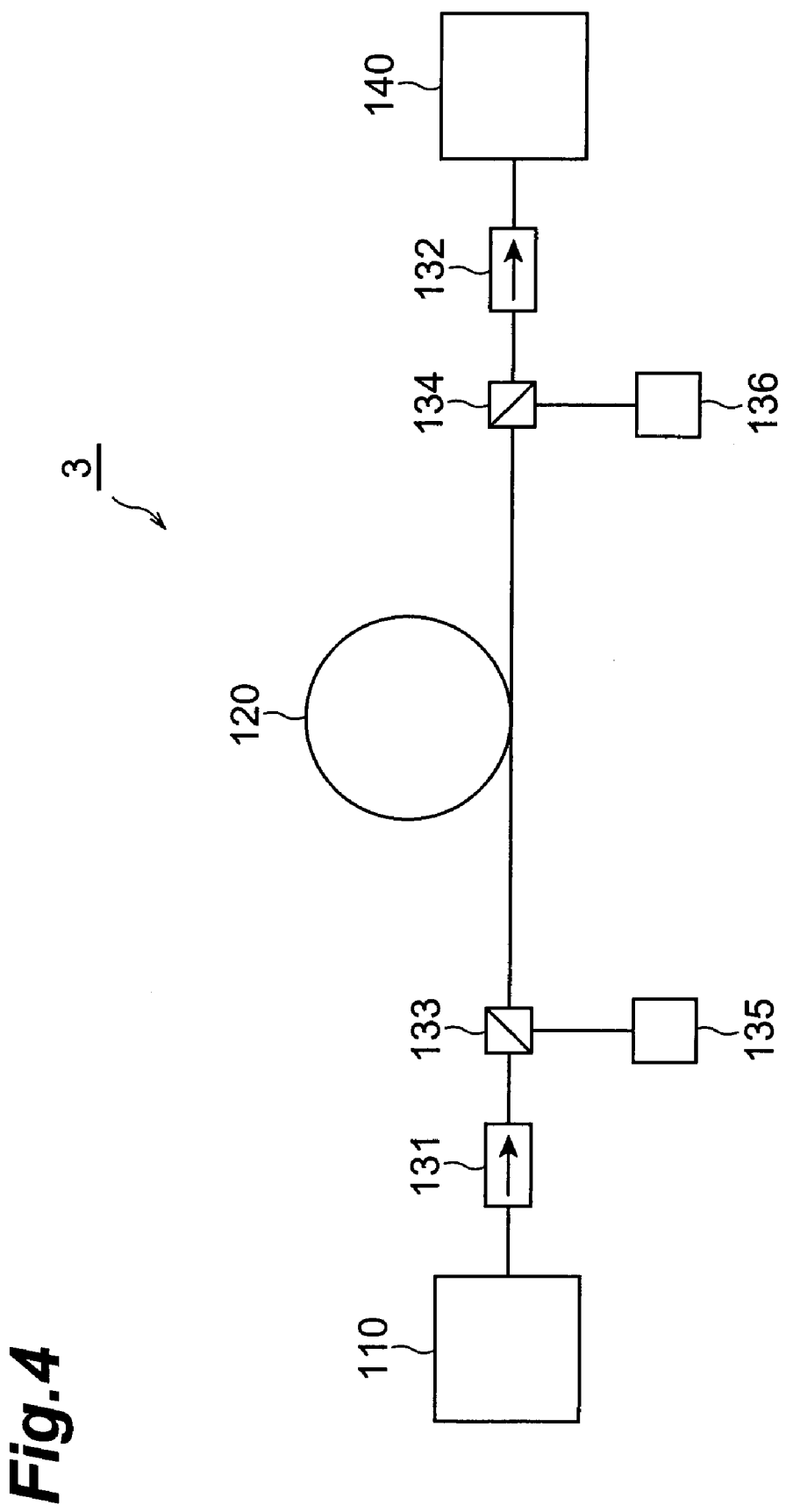
FIG. 4 is a view showing the arrangement of an optical transmission system according to a third embodiment of the present invention.

An optical transmission system according to a third embodiment of the present invention will be described next. FIG. 4 is a view showing the arrangement of an optical transmission system according to the third embodiment of the present invention. An optical transmission system 3 shown in FIG. 4 is a CWDM optical transmission system comprises an optical transmitter 110, optical receiver 140, optical isolators 131 and 132, optical couplers 133 and 134, and pumping light source units 135 and 136. The optical fiber transmission line 120 is connected between the optical transmitter 110 and the optical receiver 140. The optical isolator 131, optical coupler 133, and pumping light source unit 135 are arranged on the side of the optical transmitter 110 of the optical fiber transmission line 120. The optical isolator 132, optical coupler 134, and pumping light source unit 136 are arranged on the side of the optical receiver 140 of the optical fiber transmission line 120.

In the third embodiment, pumping light outputted from the pumping light source unit 135 passes through the optical coupler 133 and is then supplied to the optical fiber transmission line 120 in the forward direction. Pumping light outputted from the pumping light source unit 136 passes through the optical coupler 134 and is then supplied to the optical fiber transmission line 120 in the reverse direction. That is, the optical transmission system 3 according to the third embodiment has, as SRS means, a distributed Raman amplifier constituted by the optical fiber transmission line 120, optical couplers 133 and 134, and pumping light source units 135 and 136. Hence, multiplexed signal light outputted from the optical transmitter 110 is Raman-amplified during propagation through the optical fiber transmission line 120 and arrives at the optical receiver 140.

In the third embodiment, since pumping light is supplied to the optical fiber transmission line 120, the optical fiber transmission line 120 preferably has a loss peak of 0.33 dB/km or less due to OH-radicals near a wavelength of 1.39 μm.

Fourth Embodiment

Figure 5:
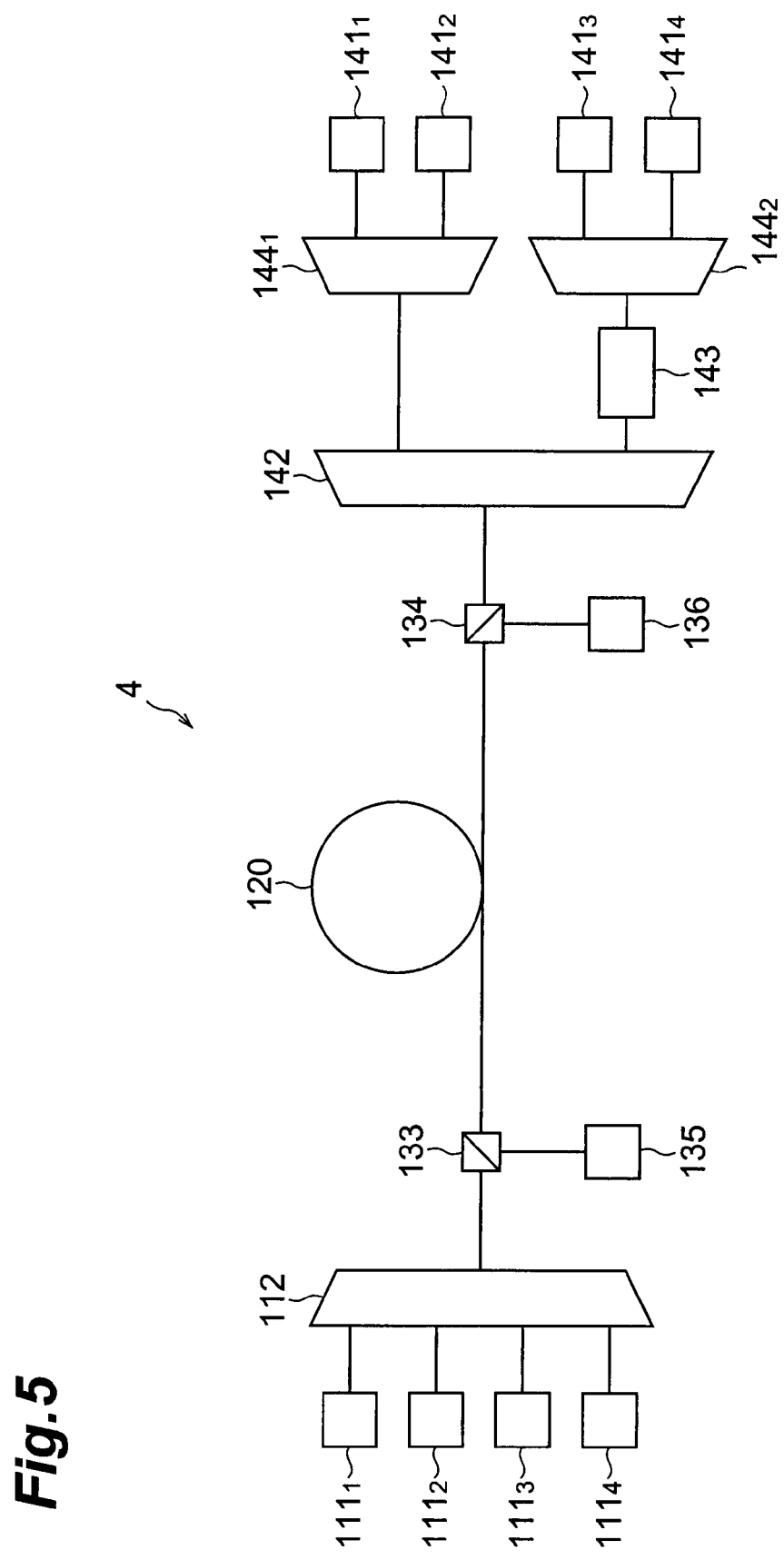
FIG. 5 is a view showing the arrangement of an optical transmission system according to a fourth embodiment of the present invention.

An optical transmission system according to a fourth embodiment of the present invention will be described next. FIG. 5 is a view showing the arrangement of an optical transmission system according to the fourth embodiment of the present invention. An optical transmission system 4 shown in FIG. 5 is a CWDM optical transmission system comprises signal light source units $111_1$ to $111_4$, optical multiplexer 112, optical fiber transmission line 120, optical demultiplexer 142, dispersion compensator 143, optical demultiplexers $144_1$ and $144_2$, light-receiving units $141_1$ to $141_4$, optical couplers 133 and 134, and pumping light source units 135 and 136.

The signal light source units $111_1$ to $111_4$ output signals with wavelengths different from each other. The optical multiplexer 112 multiplexes the light components of the signal channels outputted from the signal light source units $111_1$ to $111_4$. The signal light source units $111_1$ to $111_4$ and optical multiplexer 112 constitute an optical transmitter. The multiplexed signal light outputted from the optical multiplexer 112 preferably has an optical frequency spacing of 400 GHz or more but 12.5 THz or less and a signal channel spacing of 10 nm or more.

The optical fiber transmission line 120 is arranged between the optical multiplexer 112 and the optical demultiplexer 142. The optical coupler 133 and pumping light source unit 135 are arranged on the side of the optical multiplexer 112 of the optical fiber transmission line 120. The optical coupler 134 and pumping light source unit 136 are arranged on the side of the optical demultiplexer 142 of the optical fiber transmission line 120. Pumping light outputted from the pumping light source unit 135 passes through the optical coupler 133 and is then supplied to the optical fiber transmission line 120 in the forward direction. Pumping light outputted from the pumping light source unit 136 passes through the optical coupler 134 and is then supplied to the optical fiber transmission line 120 in the reverse direction.

That is, the optical transmission system 4 according to the fourth embodiment also has, as SRS means, a distributed Raman amplifier fabricated from the optical fiber transmission line 120, optical couplers 133 and 134, and pumping light source units 135 and 136. Hence, multiplexed signal light outputted from the optical multiplexer 112 is Raman-amplified during propagation through the optical fiber transmission line 120 and arrives at the optical demultiplexer 142. In the fourth embodiment, since pumping light is supplied to the optical fiber transmission line 120, the optical fiber transmission line 120 preferably has a loss peak of 0.33 dB/km or less due to OH-radicals near a wavelength of 1.39 μm.

The optical demultiplexer 142 demultiplexes multiplexed signal light that has propagated through the optical fiber transmission line 120 into the first wavelength range and the second wavelength range, and outputs light components in the first wavelength range to the optical demultiplexer 144$_1$ and those in the second wavelength range to the dispersion compensator 143. The dispersion compensator 143 compensates for chromatic dispersion of the light components in the second wavelength range, which have arrived from the optical demultiplexer 142, and then outputs the light components to the optical demultiplexer 144$_2$. As the dispersion compensator 143, a dispersion compensating optical fiber with a negative chromatic dispersion in the signal wavelength band can suitably be applied. The optical demultiplexer 144$_1$ demultiplexes the light components in the first wavelength range, which have arrived from the optical demultiplexer 142, into signal channels. The optical demultiplexer 144$_2$ demultiplexes the light components in the second wavelength range, which have arrived from the dispersion compensator 143, into signal channels. The light-receiving units 141$_1$ to 141$_4$ receive the signal channels demultiplexed by the optical demultiplexers 144$_1$ and 144$_2$.

As each of the optical demultiplexers 144$_1$ and 144$_2$, a dielectric multilayer filter or fiber coupler filter is preferably used. From the viewpoint of cost reduction, an inexpensive filter whose guard band between adjacent signal channels is 5 nm or more is preferably used.

Figure 6:
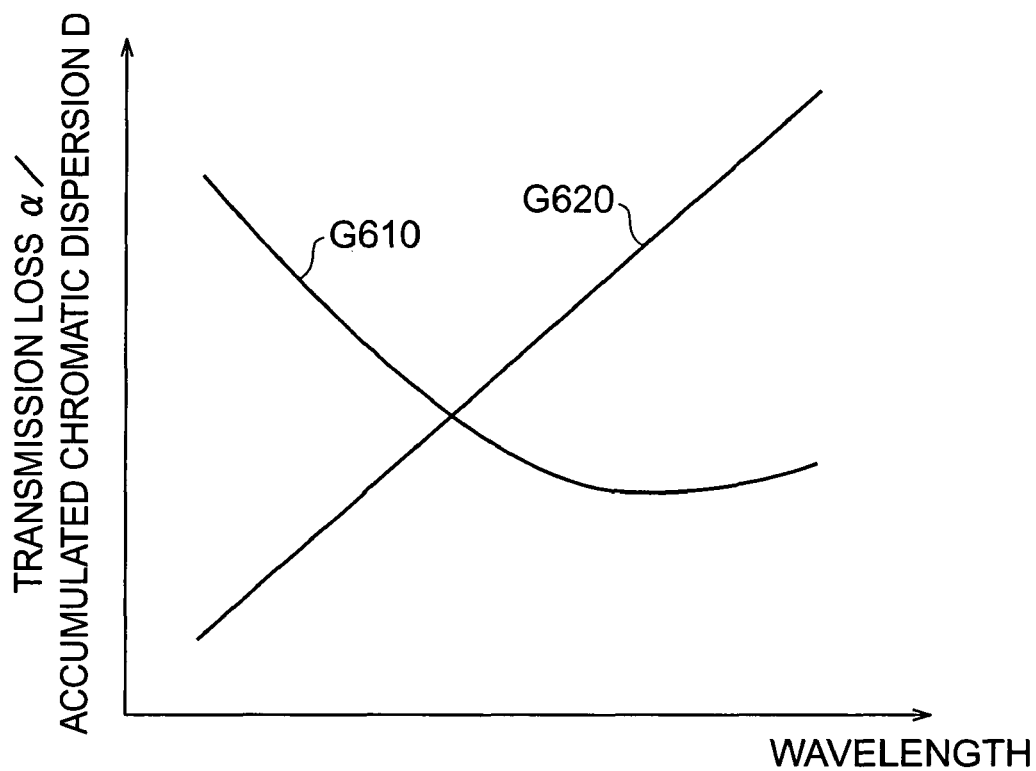
FIG. 6 is a graph showing the relationship between the wavelength dependence of transmission loss and the wavelength dependence of chromatic dispersion in an optical fiber transmission line.

FIG. 6 is a graph showing the relationship between the wavelength dependence of transmission loss and the wavelength dependence of chromatic dispersion in the optical fiber transmission line. Referring to FIG. 6, a curve G610 indicates the wavelength dependence of transmission loss, and a curve G620 indicates the wavelength dependence of chromatic dispersion. As shown in FIG. 6, in the signal wavelength band of about 1,400 to 1,500 nm, the optical fiber transmission line has a large absolute value of accumulated chromatic dispersion on the long wavelength side and a large transmission loss on the short wavelength side. In the fourth embodiment, the chromatic dispersion of a signal channel located on the long wavelength side, where the accumulated chromatic dispersion of the optical fiber transmission line 120 is large, is compensated for. In addition, a signal channel located on the short wavelength side, where the transmission loss of the optical fiber transmission line 120 is large, is Raman-amplified by a gain higher than that on the long wavelength side.

More specifically, in the fourth embodiment, the wavelength and power of Raman amplification pumping light to be supplied from the pumping light source units 135 and 136 to the optical fiber transmission line 120 are appropriately set. Accordingly, of all signal channels contained in multiplexed signal light, signal channels in the wavelength range where the transmission loss in the optical fiber transmission line 120 is equal to or more than the first threshold value are Raman-amplified by a high gain. At this time, the remaining signal channels may also be Raman-amplified. The first threshold value is appropriately set for each system.

Furthermore, when the optical demultiplexer 142 having an appropriate spectral characteristic, of all signal channels contained in the multiplexed signal light, chromatic dispersion of signal channels in the wavelength range where the accumulated chromatic dispersion in the optical fiber transmission line 120 is equal to or more than the second threshold value is compensated for by the dispersion compensator 143. At this time, to avoid any further loss, dispersion compensation is not preferably performed for the signal channels of the remaining wavelengths. The second threshold value is also appropriately set for each system.

As described above, the optical transmission system 4 according to the fourth embodiment can have the following effect in addition to the effects of the optical transmission systems according to the above-described first to third embodiments. That is, signal channels located on the short wavelength side of the signal wavelength band of the optical fiber transmission line, where the transmission loss is large, are Raman-amplified at a high gain. In addition, dispersion of signal channels located on the long wavelength side of the signal wavelength band of the optical fiber transmission line, where the accumulated chromatic dispersion is large, is compensated for. Accordingly, even in a wider signal wavelength band, CWDM optical transmission of each signal channel contained in multiplexed signal light can be performed at a high quality.

DETAILED EXAMPLE

A detailed example of the optical transmission system 3 according to the third embodiment will be described next. The optical fiber transmission line 120 was 80 km long and was constituted by one of a standard single-mode optical fiber (SMF), dispersion-shifted optical fiber (DSF), and non-zero dispersion-shifted optical fiber (NZDSF). Multiplexed signal light outputted from the optical transmitter 110 contained six channels with a spacing of 20 nm in a wavelength band of 1,510 to 1,610 nm. The wavelength and power of pumping light to be outputted from the pumping light source units 135 and 136 were set such that the net gain $G_{net}$ of Raman amplification in the optical fiber transmission line 120 became −17 dB. The number of pumping channels were 2 or 3. When the number of pumping channels was 2, the wavelengths of the pumping channels were 1,420 nm and 1,490 nm. When the number of pumping channels was 3, the wavelengths of the pumping channels were 1,420 nm, 1,460 nm, and 1,490 nm. The insertion loss of each of the optical isolators 131 and 132 was 0.6 dB.

The transmission loss at a wavelength of 1,550 nm was 0.195 dB/km in the single-mode optical fiber, 0.210 dB/km in the dispersion-shifted optical fiber, and 0.200 dB/km in the non-zero dispersion-shifted optical fiber. The transmission loss at a wavelength of 1,380 nm was 0.32 dB/km in the non-zero dispersion-shifted optical fiber. FOM-r ($=g_R/A_{eff}$) representing the Raman amplification efficiency was 0.37/W/km in the single-mode optical fiber, 0.87/W/km in the dispersion-shifted optical fiber, and 0.67/W/km in the non-zero dispersion-shifted optical fiber.

Figure 7:
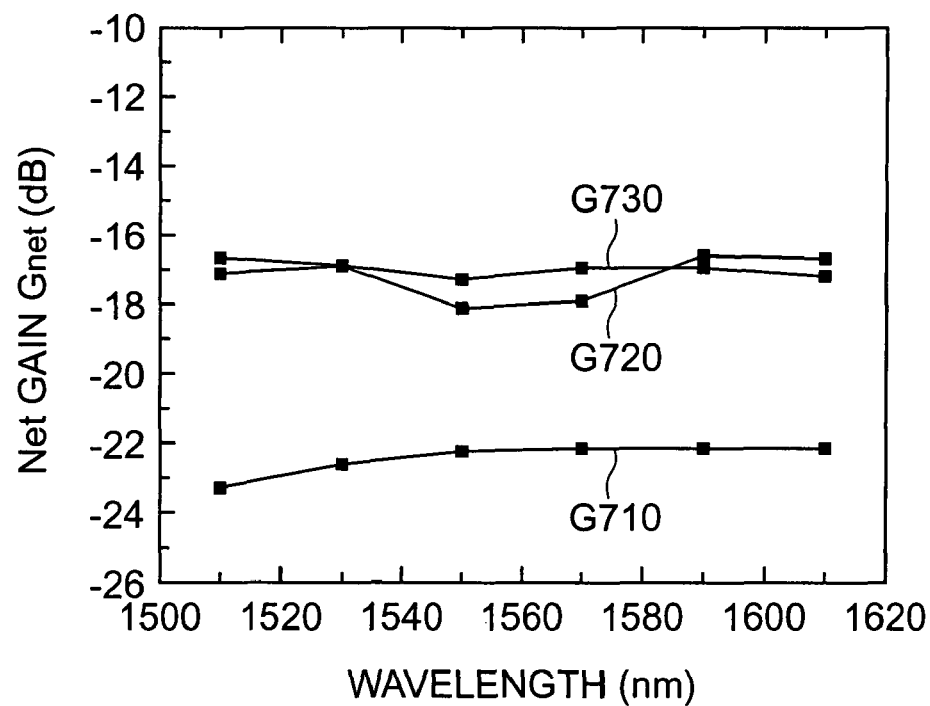
FIG. 7 is a graph showing gain spectra in the optical transmission system of a detailed example (including an SMF as an optical fiber transmission line) (Part 1)
Figure 8:
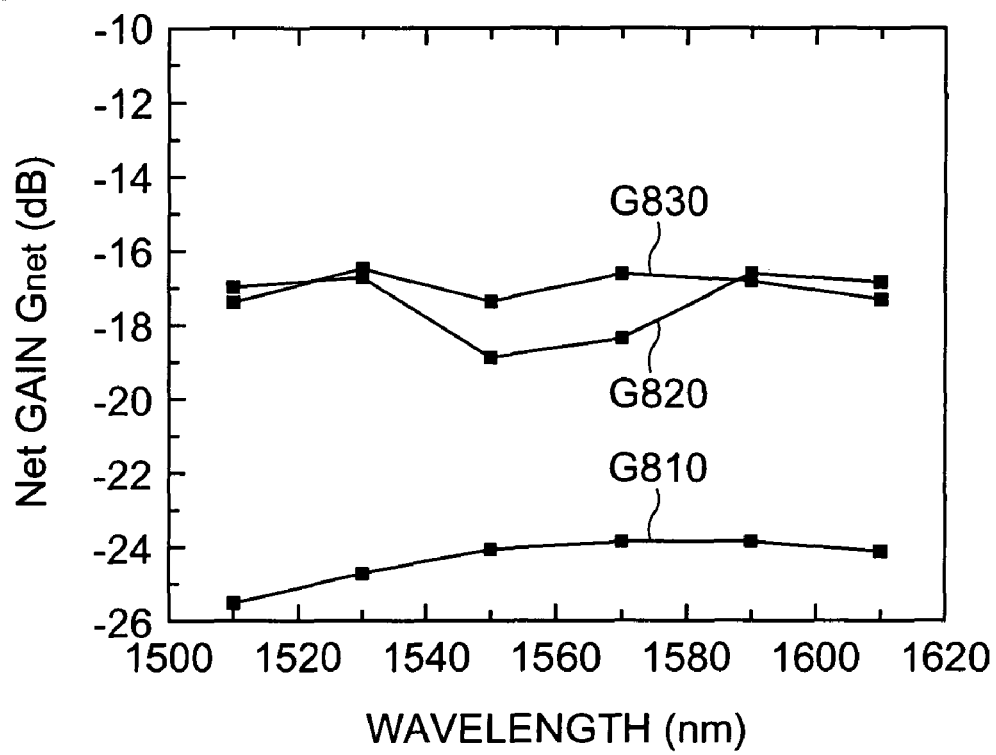
FIG. 8 is a graph showing gain spectra in the optical transmission system of another detailed example (including a DSF as an optical fiber transmission line) (Part 2)
Figure 9:
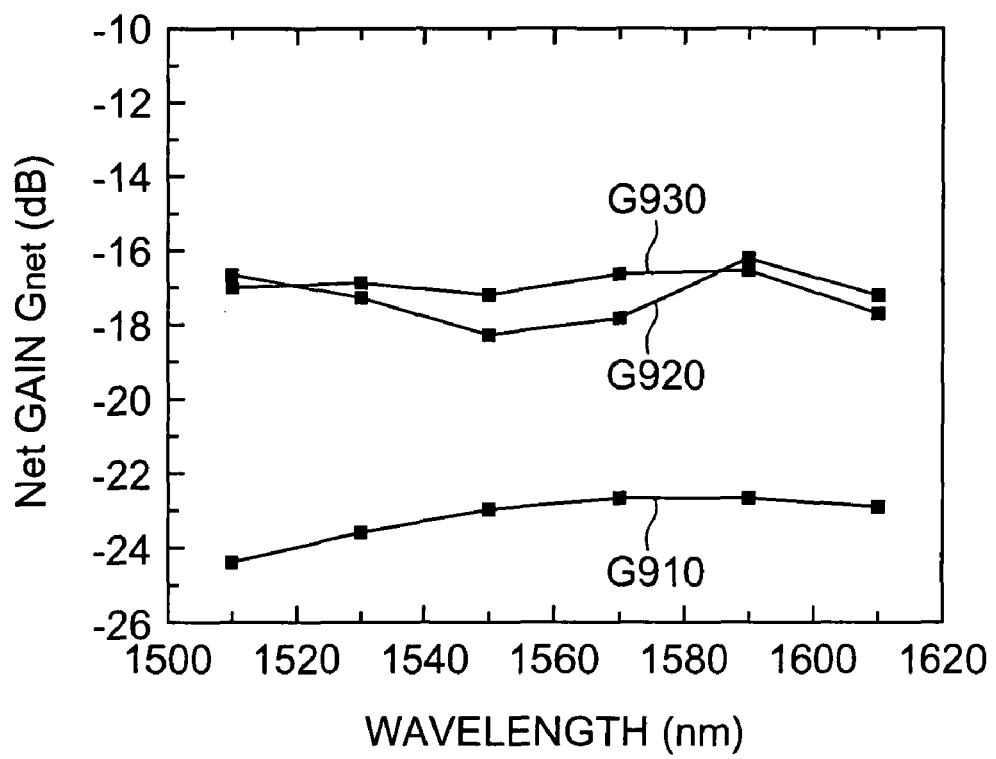
FIG. 9 is a graph showing gain spectra in the optical transmission system of still another detailed example (including an NZDSF as an optical fiber transmission line) (Part 3)
Figure 10:
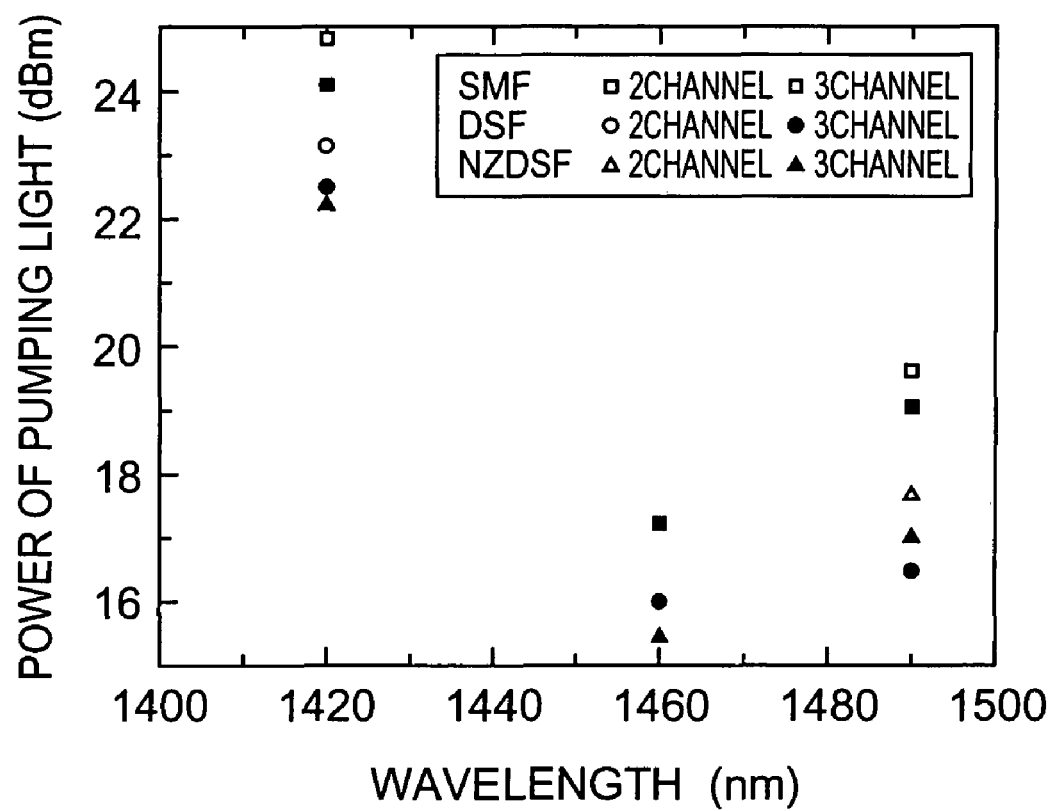
FIG. 10 is a graph showing pumping light powers in the optical transmission systems of the detailed examples.

FIGS. 7 to 9 are graphs showing gain spectra in the optical transmission systems of the detailed examples. FIG. 7 shows gain spectra when a standard single-mode optical fiber was used as the optical fiber transmission line 120. Referring to FIG. 7, a curve G710 indicates the net gain when Raman amplification was not performed, a curve G720 indicates the net gain when the number of pumping channels was 2, and a curve G730 indicates the net gain when the number of pumping channels was 3. FIG. 8 shows gain spectra when a dispersion-shifted optical fiber was used as the optical fiber transmission line 120. Referring to FIG. 8, a curve G810 indicates the net gain when Raman amplification was not performed, a curve G820 indicates the net gain when the number of pumping channels was 2, and a curve G830 indicates the net gain when the number of pumping channels was 3. FIG. 9 shows gain spectra when a non-zero dispersion-shifted optical fiber was used as the optical fiber transmission line 120. Referring to FIG. 9, a curve G910 indicates the net gain when Raman amplification was not performed, a curve G920 indicates the net gain when the number of pumping channels was 2, and a curve G930 indicates the net gain when the number of pumping channels was 3. FIG. 10 shows pumping light powers in the optical transmission systems of the detailed examples. More specifically, FIG. 10 shows the powers of pumping light to be supplied to the optical fiber transmission line constituted by a standard single-mode optical fiber (SMF) when the number of pumping channels is 2 or 3, the powers of pumping light to be supplied to the optical fiber transmission line constituted by a dispersion-shifted optical fiber (DSF) when the number of pumping channels is 2 or 3, and the powers of pumping light to be supplied to the optical fiber transmission line constituted by a non-zero dispersion-shifted optical fiber (NZDSF) when the number of pumping channels is 2 or 3.

As is apparent from FIGS. 7 to 10, independently of the type of optical fiber applied to the optical fiber transmission line 120, satisfactory gain spectra were obtained even when the number of pumping channels was 2. When the number of pumping channels was 3, more satisfactory gain spectra were obtained. The level difference between the amplified output signal light components was 3 dB or less, and the result was satisfactory even at this point. When the non-zero dispersion-shifted optical fiber with a small absorption loss due to OH-radicals was applied, the required power of pumping light on the shorter wavelength side in the signal wavelength band was small.

The optical transmission system according to the present invention serves as a CWDM optical transmission system which allows to execute Raman amplification in a wider wavelength band while maintaining the small number of light sources. To do it, the optical frequency of each pumping channel contained in pumping light is set such that the peak of Raman gain is located at an optical frequency different from that of each signal channel contained in signal light. That is, the optical frequency of the signal light is lower than that of the pumping channel by 13.2 THz. More specifically, the optical frequency of each pumping channel contained in pumping light is preferably set such that the peak of Raman gain is located at an optical frequency separated from the optical frequency of each signal channel contained in signal light by 624 GHz (5 nm) or more. On the other hand, the optical frequency of each pumping channel contained in pumping light is preferably set such that the peak of Raman gain is located at an optical frequency that is not separated from the optical frequency of each signal channel contained in signal light by 1,248 GHz (10 nm) or more. Accordingly, in the CWDM optical transmission system, a high gain flatness can be obtained in a wider wavelength band while maintaining the small number of pumping light source units.

Lumped Raman amplification for 8-channel signal light and lumped Raman amplification for 4-channel signal light will be described below.

(Lumped Raman Amplification for 8-Channel Signal Light)

A lumped Raman amplifier using 8-channel signal light will be examined here. When the number of signal channels is 8, the bandwidth of signal wavelength band is 140 nm. Hence, lumped Raman amplification is difficult to perform. For lumped Raman amplification, signal channels and pumping channels are alternately arranged. To implement such channel arrangement in DWDM with a small signal channel spacing, the spacing between adjacent channels must be taken into consideration. In CWDM in the optical transmission system according to the present invention, the signal channel spacing is as large as 20 nm. For this reason, when fiber grating laser (FGL) is to be used as a pumping light source unit, interference between the signal light and back Rayleigh scattering light due to propagation of pumping light poses no serious problem.

Figure 11:
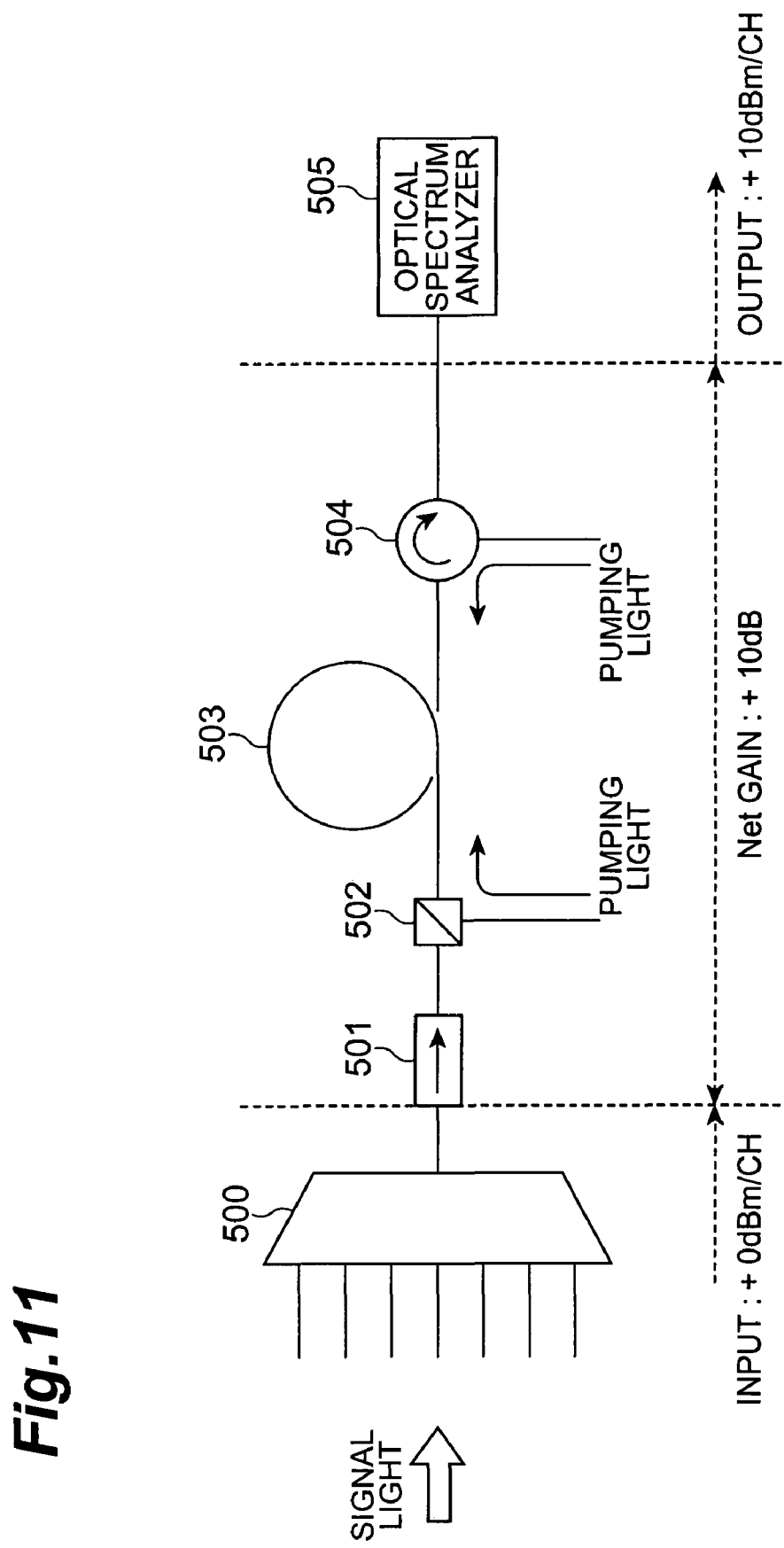
FIG. 11 is a view showing the arrangement of a Raman amplifier prepared as an experimental system.

FIG. 11 is a view showing the structure of an experimental system prepared to evaluate lumped Raman amplification for 8-channel Raman signal light. The experimental system (LRA) shown in FIG. 11 comprises an optical multiplexer 500 included in a transmitter and an optical spectrum analyzer 505 prepared as a receiver. The experimental system also has an optical isolator 501, optical coupler 502, optical fiber for Raman amplification 503, and optical circulator 504, which are arranged sequentially between the optical multiplexer 500 and the optical spectrum analyzer 505. This experimental system uses 6-channel pumping light such that the net gain becomes +10 dB (the input power of the 8-channel CWDM signal is +0 dBm/CH, and the output power is +10 dBm/CH).

The optical multiplexer 500 multiplexes 8 signal channels at a channel spacing of 20 nm in a wavelength range of 1,470 to 1,610 nm. The optical coupler 502 supplies pumping light with a wavelength of 1,360 nm to the optical fiber for Raman amplification 503 in the forward direction and also passes signal light that has passed through the optical isolator 501 to the optical fiber for Raman amplification 503. The optical fiber for Raman amplification 503 is a highly nonlinear fiber with the length of 3 km. The optical circulator 504 supplies pumping light containing pumping channels with wavelengths of 1,360 nm, 1,390 nm, 1,405 nm, 1,430 nm, 1,460 nm, and 1,500 nm to the optical fiber for Raman amplification 503 in the reverse direction and also passes the amplified signal light from the optical fiber for Raman amplification 503 to the optical spectrum analyzer 505. FIG. 12 shows the pumping power of each pumping channel supplied. The optical fiber for Raman amplification 503 preferably has a negative chromatic dispersion. This is because a normal optical fiber transmission line has a positive chromatic dispersion in the signal wavelength band, and consistency with this chromatic dispersion is necessary. The optical fiber for Raman amplification also preferably has a chromatic dispersion with a large absolute value. The value is preferably −20 ps/nm/km or less and, more preferably, −60 ps/nm/km or less. This experimental system uses a pumping channel with a wavelength of 1,405 nm as a pumping channel for backward pumping. Actually, use of a pumping channel with a wavelength of 1,410 nm is presumed (it rarely influences the net gain or the like). When pumping light with a channel wavelength of 1,410 nm can be used, it can be multiplexed with signal light using an 8-input/1-output optical multiplexer or optical circulator. Hence, an LRA can be manufactured at a low cost.

FIGS. 13A and 13B are views for explaining the arrangement of pumping channels and signal channels in this experimental system. As shown in FIG. 13A, in lumped Raman amplification for 4-channel signal light, two pumping channels with wavelengths of 1,460 nm and 1,500 nm are used to perform lumped Raman amplification of four signal channels on the long wavelength side of the signal wavelength band. On the other hand, in lumped Raman amplification for 8-channel signal light, as shown in FIG. 13B, two pumping channels (wavelengths: 1,460 nm and 1,500 nm) are used to Raman-amplify four signal channels on the long wavelength side of the signal wavelength band. In addition, when four pumping channels with wavelengths of 1,360 nm, 1,390 nm, 1,405 nm, and 1,430 nm are additionally supplied, four signal channels on the short wavelength side can also be Raman-amplified. When the pumping channels and signal channels to be amplified are arranged in the above way, lumped Raman amplification for 4-channel signal light can easily be upgraded to lumped Raman amplification for 8-channel signal light.

Figure 14A:
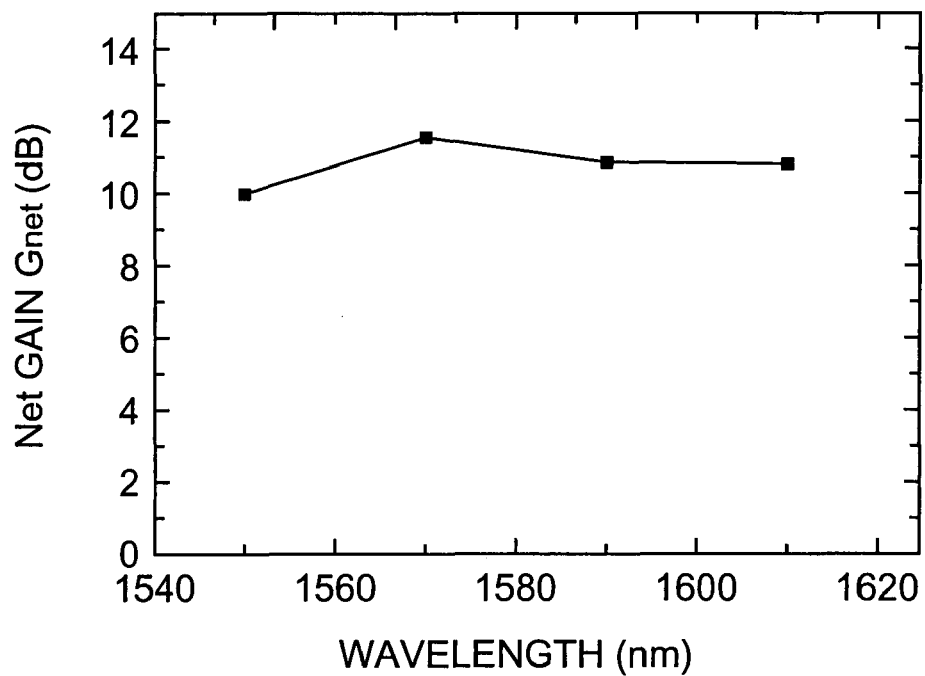
FIGS. 14A and 14B are graphs showing the wavelength dependences of net gain and noise characteristic of four signal channels located on the long wavelength side of the signal wavelength band in the experimental system shown in FIG. 11.
Figure 14B:
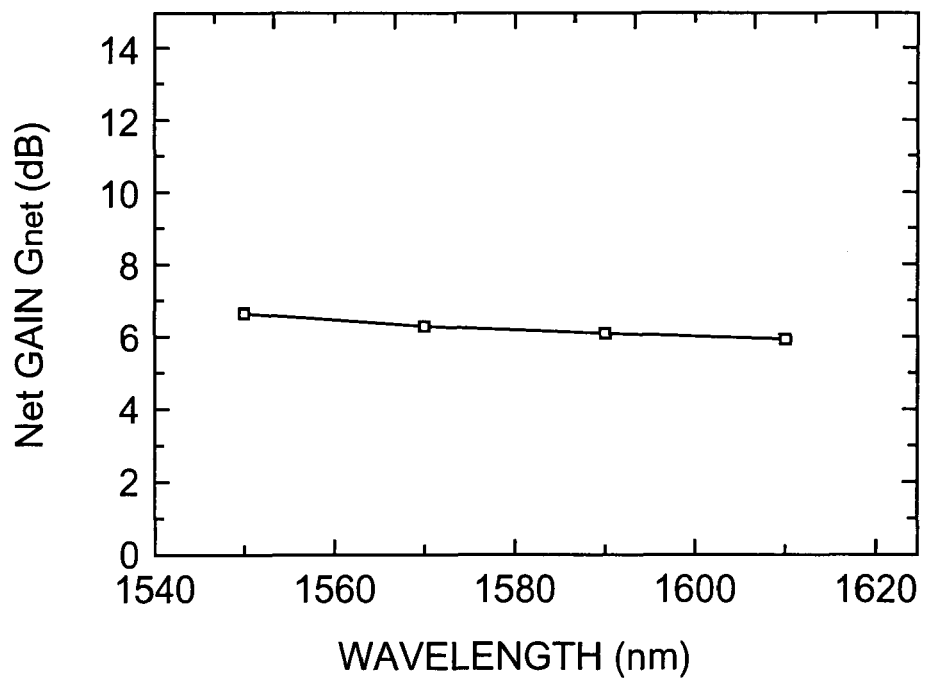

FIGS. 14A and 14B show the simulation result of net gain (FIG. 14A) and net noise characteristic (NF: Noise Figure, FIG. 14B) of Raman amplification of four signal channels on the long wavelength side of the signal wavelength band. The required pumping power to be supplied to the optical fiber for Raman amplification is 358.9 mW for the pumping channel with a wavelength of 1,460 nm and 175.1 mW for the pumping channel with a wavelength of 1,500 nm.

Figure 15A:
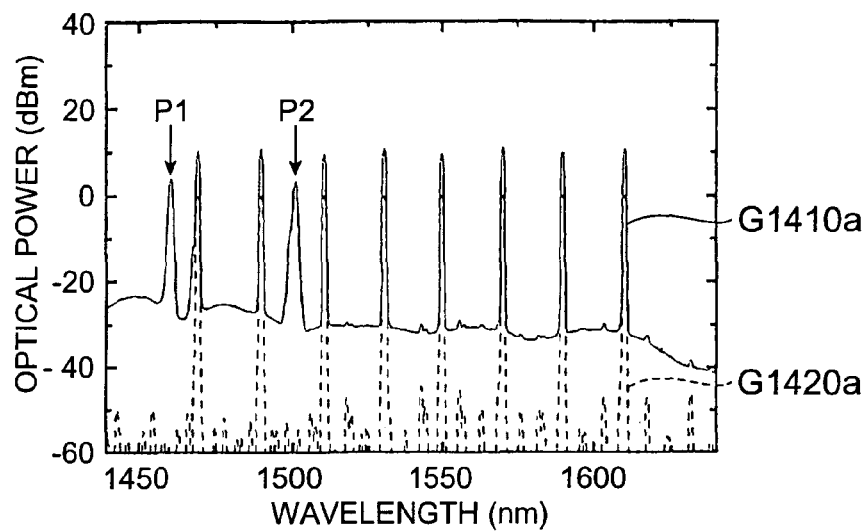
FIGS. 15A to 15C are graphs respectively showing the gain spectrum, the wavelength dependence of net gain, and the wavelength dependence of net noise characteristic of the experimental system shown in FIG. 11.
Figure 15B:
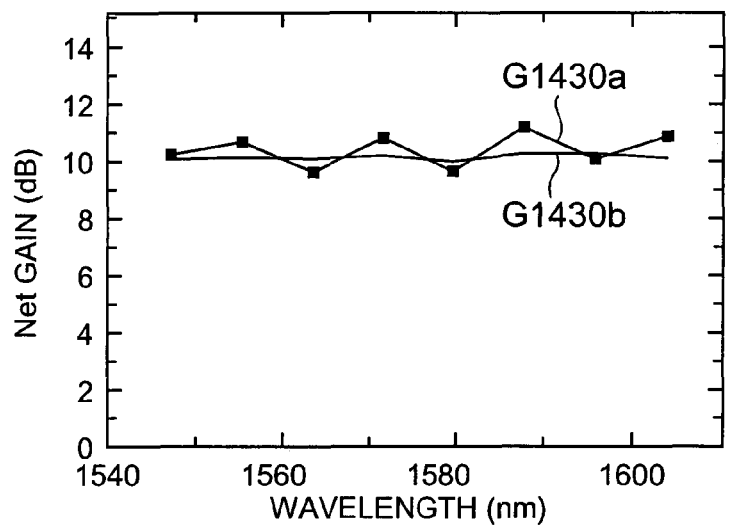
Figure 15C:
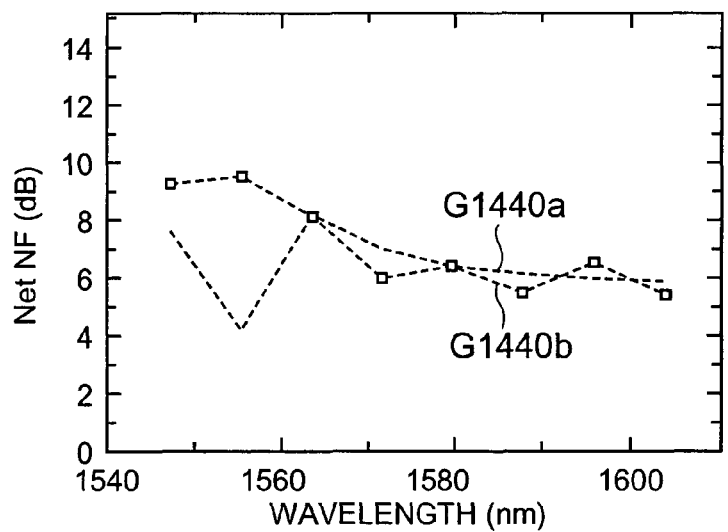

FIGS. 15A to 15C respectively show the gain spectrum (FIG. 15A), the wavelength dependence of net gain (FIG. 15B), and the wavelength dependence of net noise characteristic (FIG. 15C) in this experimental system (LRA which performs lumped Raman amplification for 8-channel signal light). Referring to FIG. 15B, a curve G1430a indicates an actually measured net gain, and a curve G1430b represents a simulation result. Referring to FIG. 15C, a curve G1440a indicates an actually measured net NF, and a curve G1440b indicates a simulation result.

In FIG. 15A, the back pumping scattering component of pumping light was observed at 1,460 nm (arrow P1 in FIG. 15A) and 1,500 nm (arrow P2 in FIG. 15A). In FIG. 15B, the net gain is about 10 dB. In FIG. 15C, the difference in NF between the actually measured value and the simulation result observed on the short wavelength side is probably caused because the power distribution of forward pumping light and backward pumping light slightly changes between the actual measurement and the simulation, or the back Rayleigh scattering component of pumping light is not taken into consideration in the simulation. The powers of pumping channels contained in supplied pumping light are the same as in the table of FIG. 12. The total power of pumping light is about 1,121 mW. In this case, even when a high-output laser is used, and the distribution of forward pumping power and backward pumping power is changed, a total of 10 pumping light sources (pumping LDs) (two forward pumping light sources at 130 nm, four backward pumping light sources at 1,360 nm and 1,390 nm, and four pumping light sources at other wavelengths) are necessary.

Figure 16A:
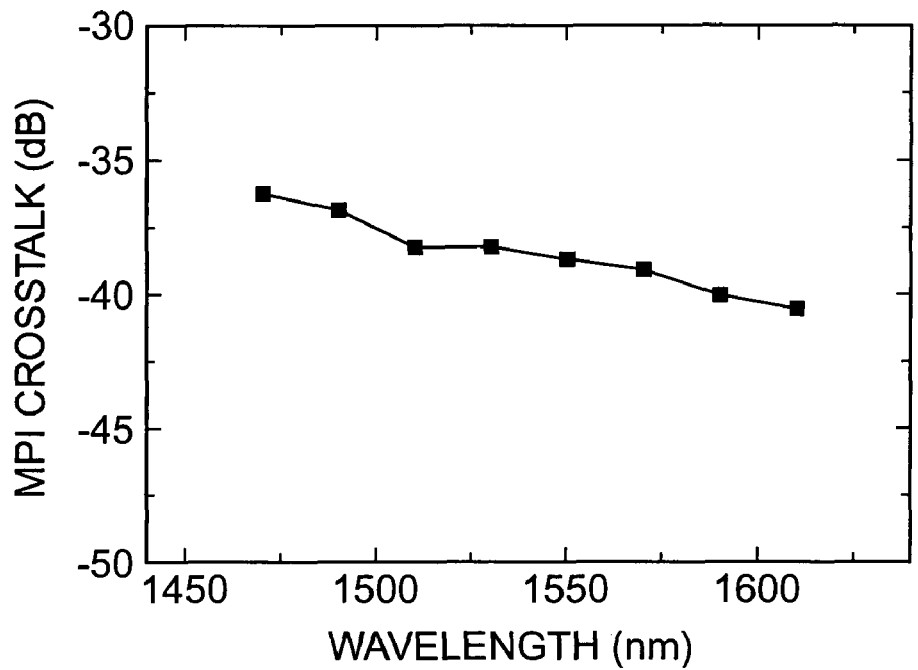
FIGS. 16A and 16B are graphs showing the wavelength dependences of MPI crosstalk and phase shift in the experimental system shown in FIG. 11.
Figure 16B:
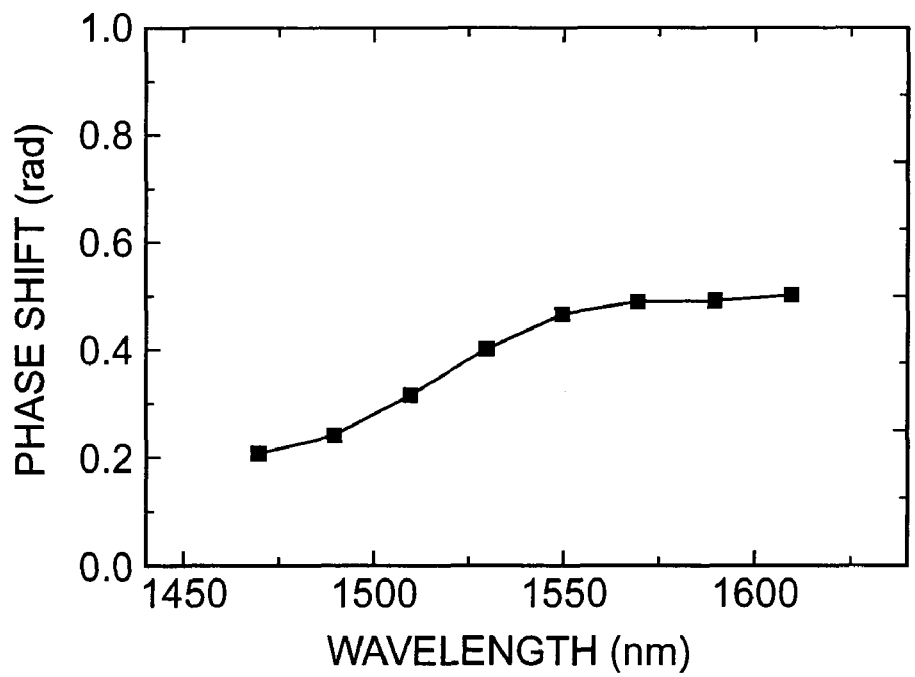

FIG. 16A shows the simulation result of MPI (Multi-Line Interference) crosstalk in the experimental system for lumped Raman amplification for 8-channel signal light. FIG. 16B shows the simulation result of phase shift in this experimental system. Both the MPI crosstalk and the phase shift pose no problem.

(Lumped Raman Amplification for 4-Channel Signal Light)

Figures 17, 18:
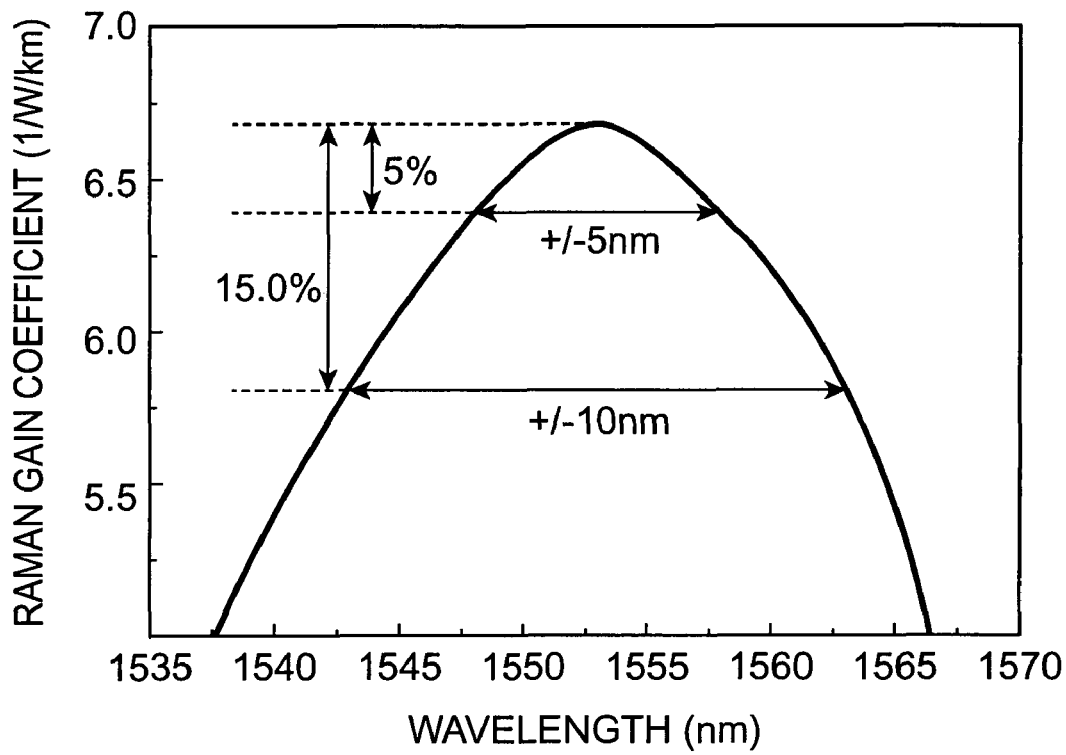
FIG. 17 is a graph showing an example of the Raman gain spectrum.
FIG. 18 is a table showing the relationship between four signal channels and pumping channels.
Figure 19:
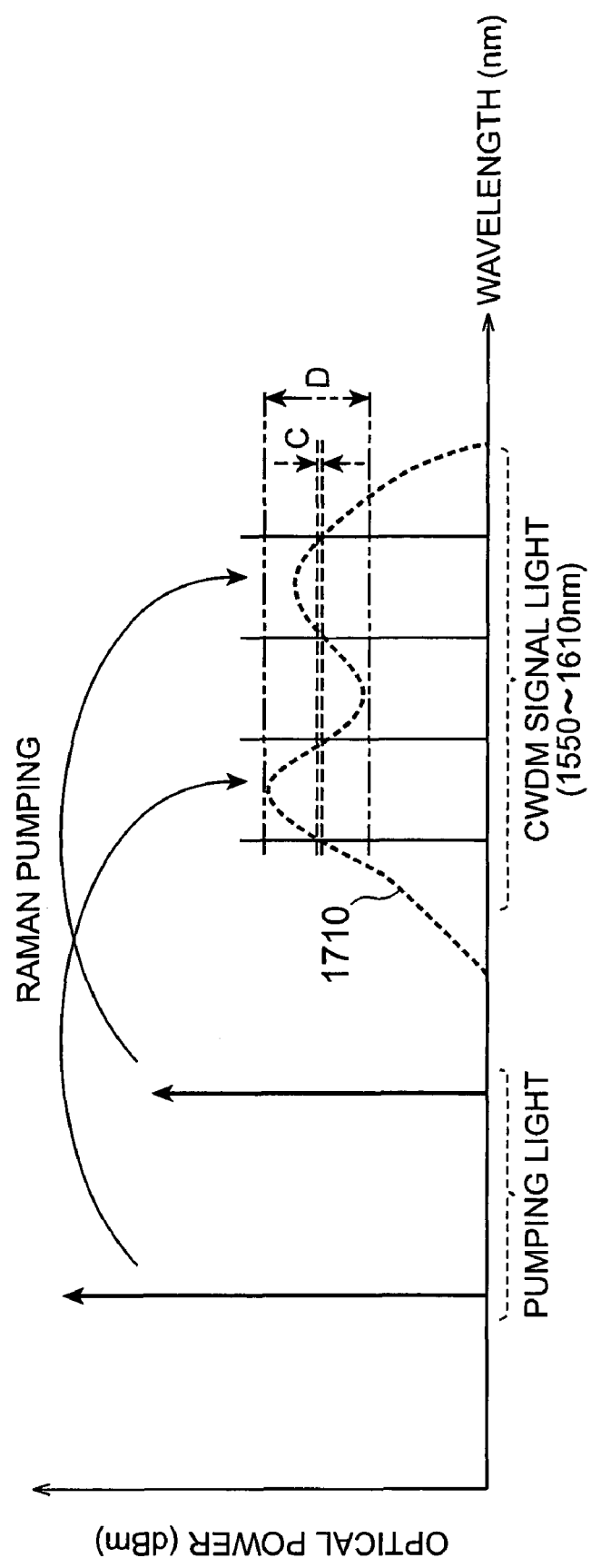
FIG. 19 is a graph showing the arrangement relationship between signal channels and pumping channels in lumped Raman amplification for 4-channel signal light.

Lumped Raman amplification for 4-channel signal light will be described next. FIG. 17 is a graph showing the relationship between the gain spectrum in CWDM and pumping light and signal light. Since the signal light spacing is wide in CWDM, the gain flatness can be increased by aligning only gains at the respective signal channels, unlike DWDM. In other words, the gain flatness can be increased even by using a small number of pumping light sources (pumping LDs). For example, as shown in FIG. 19, pumping light containing two pumping channels can be used to execute lumped Raman amplification for 4-channel signal light. As shown in FIG. 19, even when two pumping channels are used, a gain uniformity C of CWDM is much smaller than that of DWDM (the gain flatness is high). A gain spectrum 1710 derived from the two pumping channels has two peaks of Raman gain in the signal wavelength band. In this case, the gain flatness can further be increased by adding a new pumping channel.

The table of FIG. 18 shows the relationship between a CWDM signal (four channels) and pumping channel wavelengths. To perform Raman amplification in the wavelength band of 1,400 to 1,700 nm, the waveform spacing (channel spacing) between pumping channels contained in pumping light needs to be at least 37.5 nm (in this case, about 40 nm).

In the pumping light, the optical frequency (peak frequency of the Raman gain spectrum) lower than the optical frequency of each pumping channel by 13.2 THz is preferably separated from each signal channel of CWDM signal light by at least 624 GHz (5 nm). FIG. 17 shows the spectrum shape of the Raman gain coefficient. When separated from the peak of Raman gain by 2,496 GHz (10 nm), the Raman gain coefficient decreases by about 15%. When a signal channel is arranged at the optical frequency of this peak of Raman gain, the ON/OFF gain uniformity when the signal channel spacing is 2,496 GHz becomes as large as 15% or more. Hence, when a signal channel is arranged at a position separated from the peak of Raman gain by 624 GHz, the gain uniformity becomes smaller, resulting in advantageous condition.

When a plurality of pumping channels are prepared, the wavelength spacing (channel spacing) between adjacent pumping channels is preferably at least 4,680 GHz (about 37.5 nm) or more. When the signal wavelength band is 100 nm or less, a number m of pumping channels contained in pumping light and a number n of signal channels contained in signal light preferably satisfy a relation given by m≦n/2. When the signal wavelength band is 100 nm or more, the number m of pumping channels contained in pumping light and the number n of signal channels contained in signal light preferably satisfy a relation given by m≦(n+4)/2.

Figure 20:
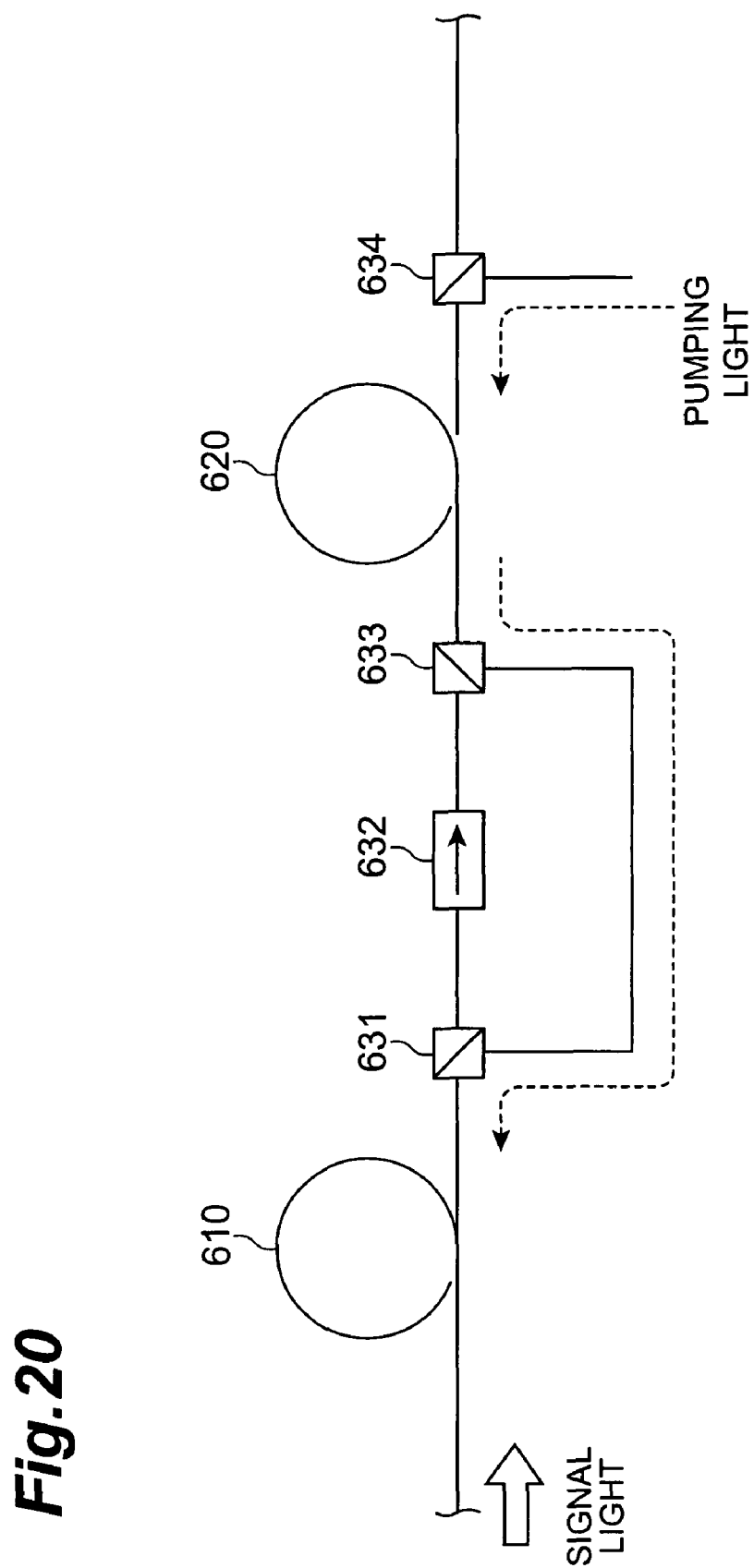
FIG. 20 is a view showing the arrangement of the main part in a Raman amplifier to improve the MPI crosstalk.

As for the length of the optical fiber (optical fiber for Raman amplification) to be used for Raman amplification, MPI generated between multi-line reflected light components propagating in the same direction as that of signal light poses a practical problem, though the situation changes depending on the Raman gain coefficient or transmission loss of the optical fiber itself. When the optical power ratio between signal light and multi-line reflected light is $MPI_{crosstalk}$ (dB) (=$P_{signal}$ (dB)−$P_{MPI}$ (dB)), the Raman amplifier is preferably designed such that the value $MPI_{crosstalk}$ becomes at least 30 dB. If $MPI_{crosstalk}$ is smaller than 30 dB, a bypass line that detours an optical isolator 632 arranged between optical fiber for Raman amplifications 610 and 620 may be arranged, as shown in FIG. 20. In the Raman amplifier shown in FIG. 20, an optical coupler 631 temporarily guides pumping light that has propagated through the optical fiber for Raman amplification 620 to the bypass line. An optical coupler 633 guides the pumping light that has propagated through the bypass line to the optical fiber for Raman amplification 610. An optical coupler 634 supplies pumping light to the optical fiber for Raman amplification 620. In this Raman amplifier, the optical coupler (WDM filter) or optical isolator is used. However, an optical circulator may be used.

To more efficiently generate a nonlinear phase shift, the Raman amplification fiber preferably has a nonlinear refractive index of $3.5 \times 10^{-20}$ [m$^2$/W] or more and, more preferably $4.5 \times 10^{-20}$ [m$^2$/W] or more. To more efficiently generate a nonlinear phase shift, the effective area is preferably 30 mm$^2$ or less and, more preferably, 15 mm$^2$ or less. Hence, when $n^2/A_{\it eff} \geq 1.7 \times 10^{-9}$ [1/W], or more preferably, $n^2/A_{\it eff} \geq 3.0 \times 10^{-9}$ [1/W], the transmission characteristics can effectively be improved.

To increase the Raman amplification efficiency, the loss of the fiber is preferably 1.0 dB/km or less in terms of signal wavelength. In consideration of an increase in loss due to absorption loss of OH-radicals near the pumping light wavelength, the increase amount of the loss due to the OH-radicals in a band of 1.38 to 1.39 µm is preferably 0.5 dB/km or less.

The fiber to be used for Raman amplification preferably has negative chromatic dispersion. This is because a normal transmission line has positive dispersion in the signal wavelength, and consistency with this chromatic dispersion is necessary. The absolute value of the chromatic dispersion is preferably large. The value is preferably −20 ps/nm/km or less and, more preferably, −60 ps/nm/km or less. When the Raman amplification efficiency is taken into consideration, the connection loss between the optical fiber for Raman amplification and a normal optical fiber is preferably 0.5 dB or less.

Next, some applications of an optical transmission system according to the present invention will be described below.

(First Application)

Figure 21:
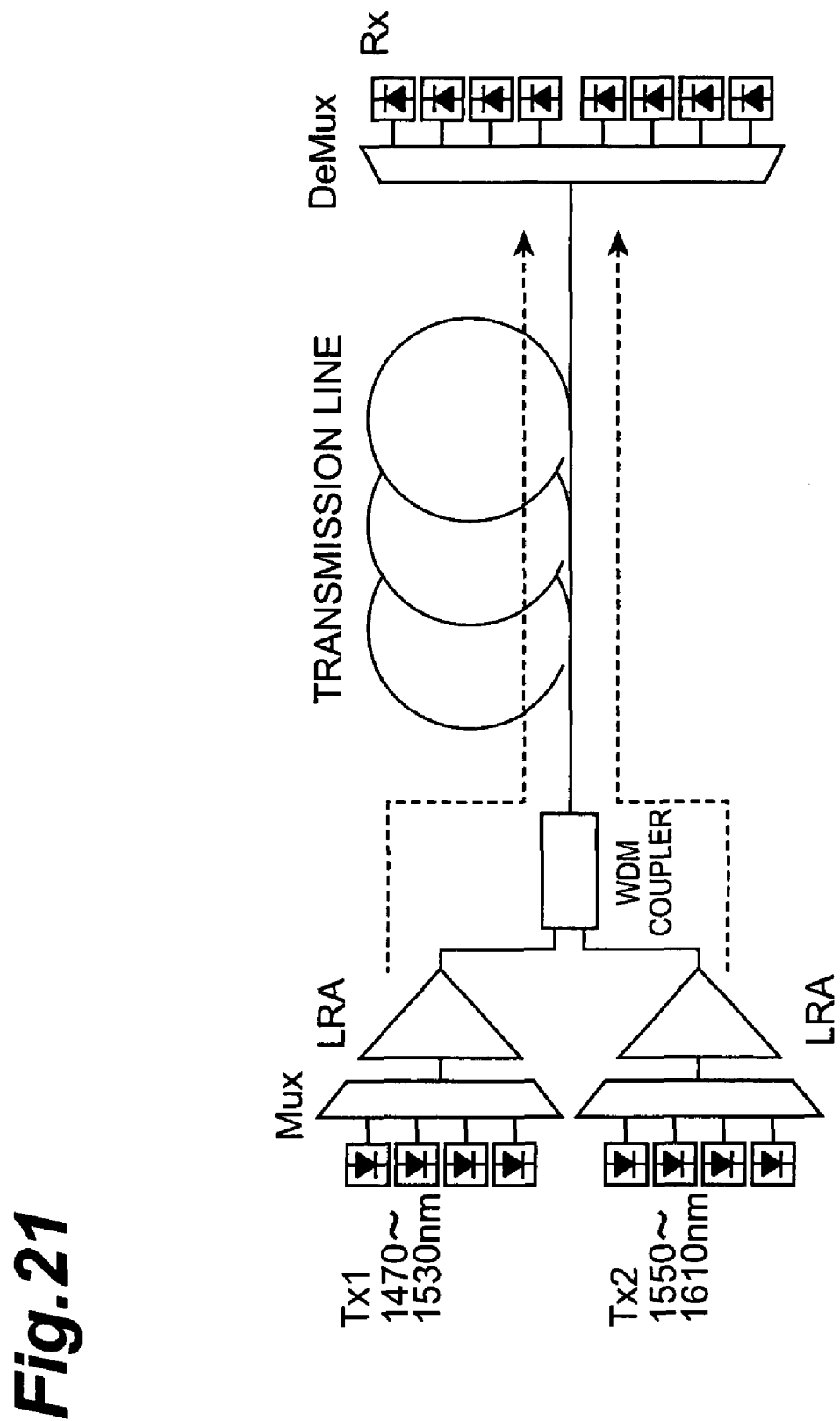
FIG. 21 is a view showing the arrangement of an optical transmission system according to a first application of the present invention.

FIG. 21 is a view showing the arrangement of an optical transmission system according to a first application of the present invention. The optical transmission system according to the first application amplifies signal channels respectively by using LRA for wavelength of 1470 to 1530 nm (four channels) and LRA for wavelength of 1550 to 1610 nm (four channels), and allows 8-channel CWDM signal light propagating through one optical fiber transmission line. The amplified WDM signal light is multiplexed by the WDM coupler and propagates through the transmission line. In the optical transmission system having such a structure, when bringing an initial cost in line, one transmitter for four channels and one LRA are arranged and driven, respectively. Next, when increasing the number of signal channel, another Raman amplifier can be used. In accordance with the optical transmission system having such a structure, upgradability due to wavelength band division can be obtained.

(Second Application)

Figure 22:
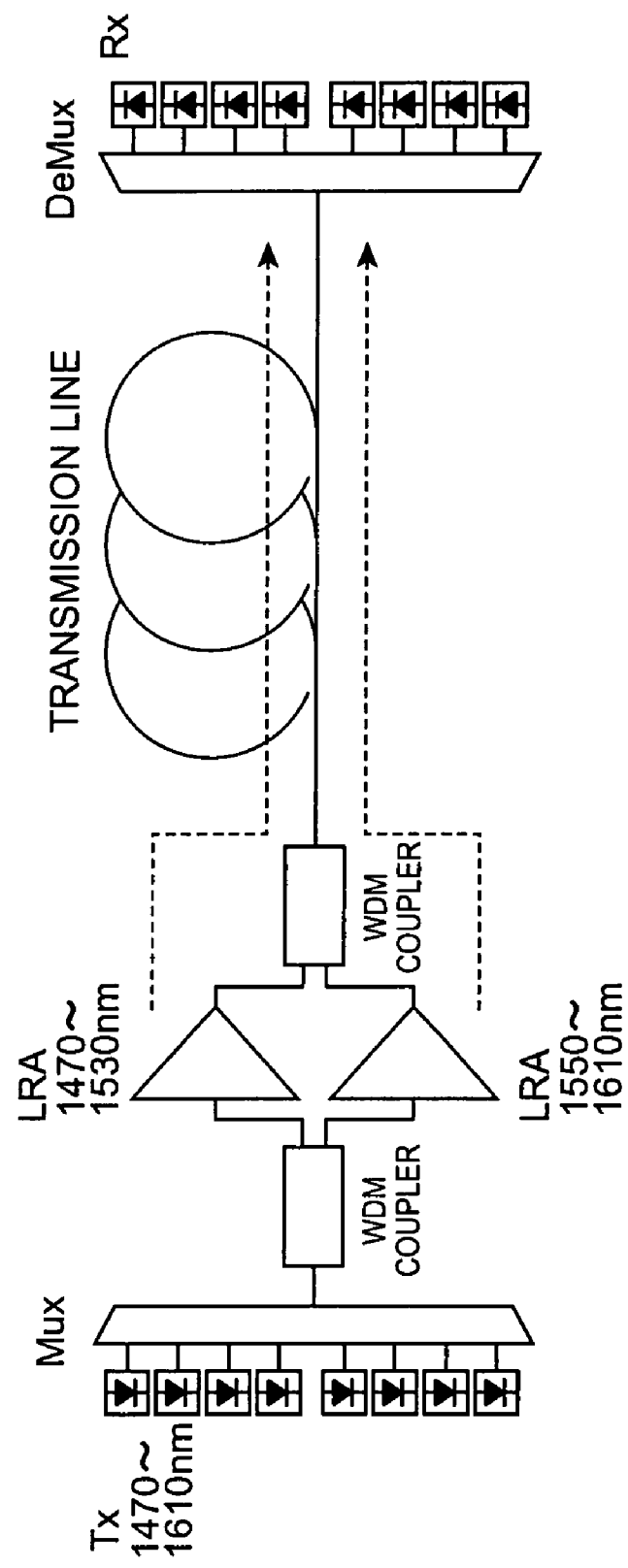
FIG. 22 is a view showing the arrangement of an optical transmission system according to a second application of the present invention.

FIG. 22 is a view showing the arrangement of an optical transmission system according to a second application of the present invention. The optical transmission system according to the second application, as in the case of the optical transmission system according to the above first application, separates the 8-channel signal light into signal light with wavelengths of 1470 to 1530 nm and signal light with wavelengths of 1550 to 1610 nm by the WDM coupler and multiplexes them by the WDM coupler again after amplified them by the Raman amplifier, in transmission of 8-channel CWDM signal light.

In the optical transmission system having such a structure, when bringing an initial cost in line, a signal light module to be firstly transmitted in the transmitter and one LRA for four channels are arranged and driven, respectively. And, when increasing the number of signal channel, another Raman amplifier can be used. In accordance with the optical transmission system having such a structure, upgradability due to wavelength band division can be obtained.

(Third Application)

Figure 23:
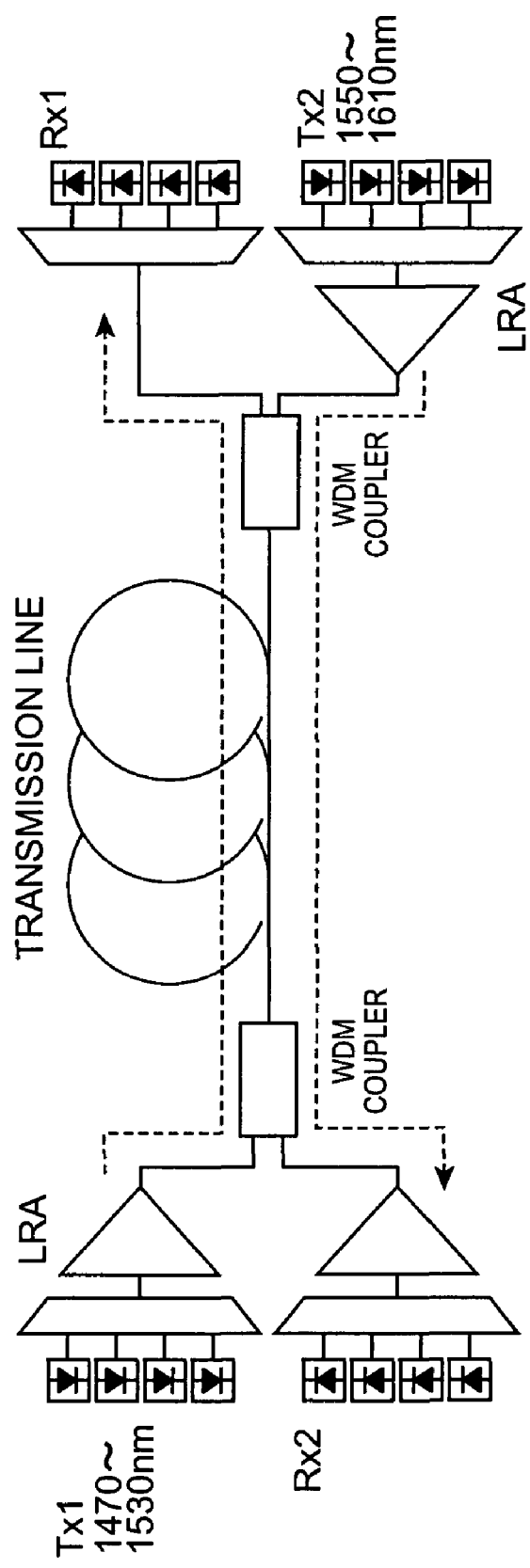
FIG. 23 is a view showing the arrangement of an optical transmission system according to a third application of the present invention.

FIG. 23 is a view showing the arrangement of an optical transmission system according to a third application of the present invention. The optical transmission system according to the third application amplifies signal channels respectively by using LRA for wavelength of 1470 to 1530 nm (four channels) and LRA for wavelength of 1550 to 1610 nm (four channels), and allows the amplified signal light propagating through one optical fiber transmission line in the bi-direction. The amplified signal light is multiplexed by the WDM coupler and propagates through the optical fiber transmission line. By the optical transmission line having such a structure, a bi-directional transmission of signal light with wavelengths of 1470 to 1530 nm and signal light with wavelengths of 1550 to 1610 nm can be achieved.

(Fourth Application)

Figure 24:
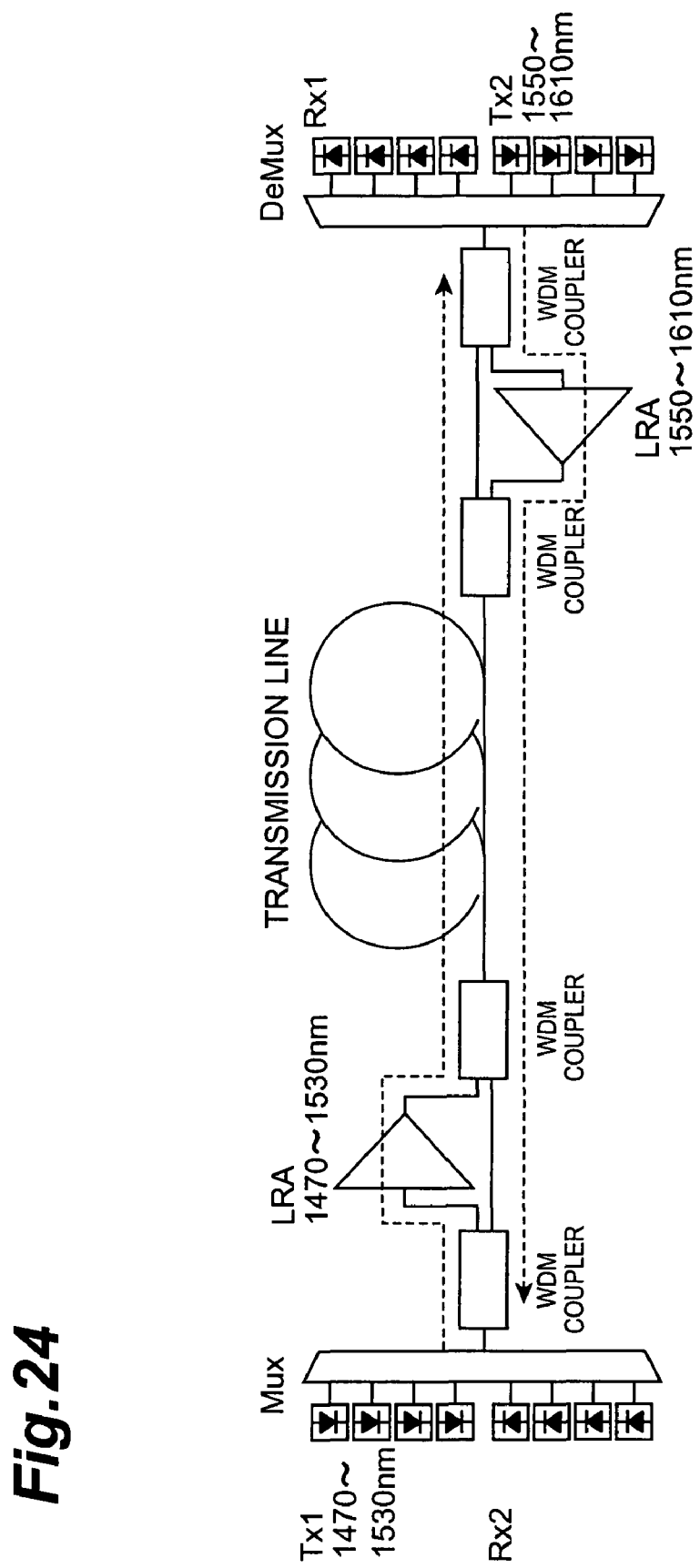
FIG. 24 is a view showing the arrangement of an optical transmission system according to a fourth application of the present invention.

FIG. 24 is a view showing the arrangement of an optical transmission system according to a fourth application of the present invention. The optical transmission system is a system in which transmission module and receiving module are integrally formed. In this case, after signal light with wavelengths of 1470 to 1530 nm and signal light with wavelengths of 1550 to 1610 nm are separated by the WDM coupler and sent from the transmitter, one signal light is intermediately Raman-amplified by LRA and another signal light passes therethrough. And, by multiplexing these signal light, a bi-directional transmission can be achieved.

(Fifth Application)

Figure 25:
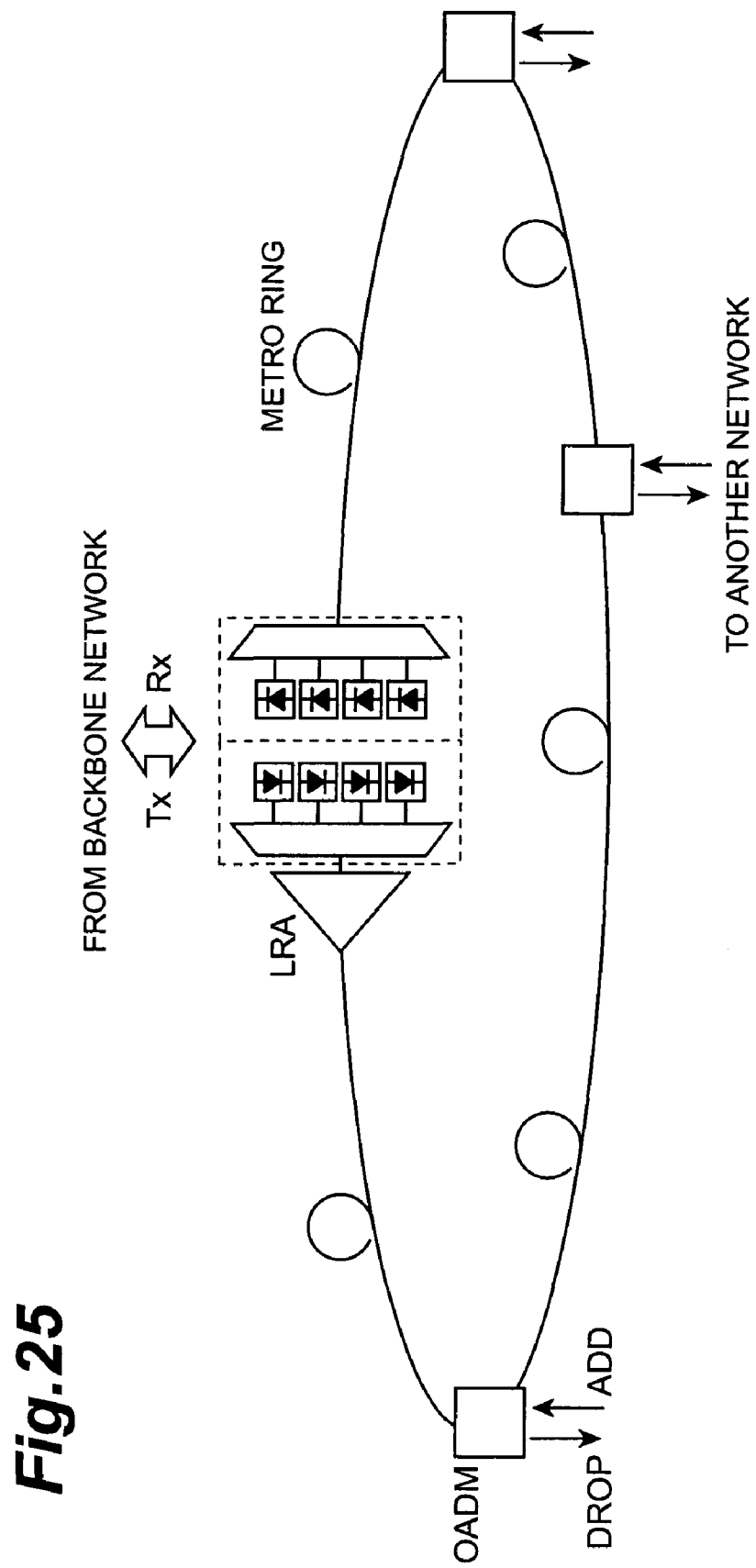
FIG. 25 is a view showing the arrangement of an optical transmission system according to a fifth application of the present invention.

FIG. 25 is a view showing the arrangement of an optical transmission system according to a fifth application of the present invention. The optical transmission system according to the fifth application uses a gain obtained by the Raman amplifier to compensate for loss of optical devices. As a structure for this case, a structure in which optical add/drop module (OADM) is used can be considered. By arranging the LRA so as to compensate for the OADM loss, Metro Ring Network having a simple structure and a wide band can be constructed.

(Sixth Application)

Figure 26:
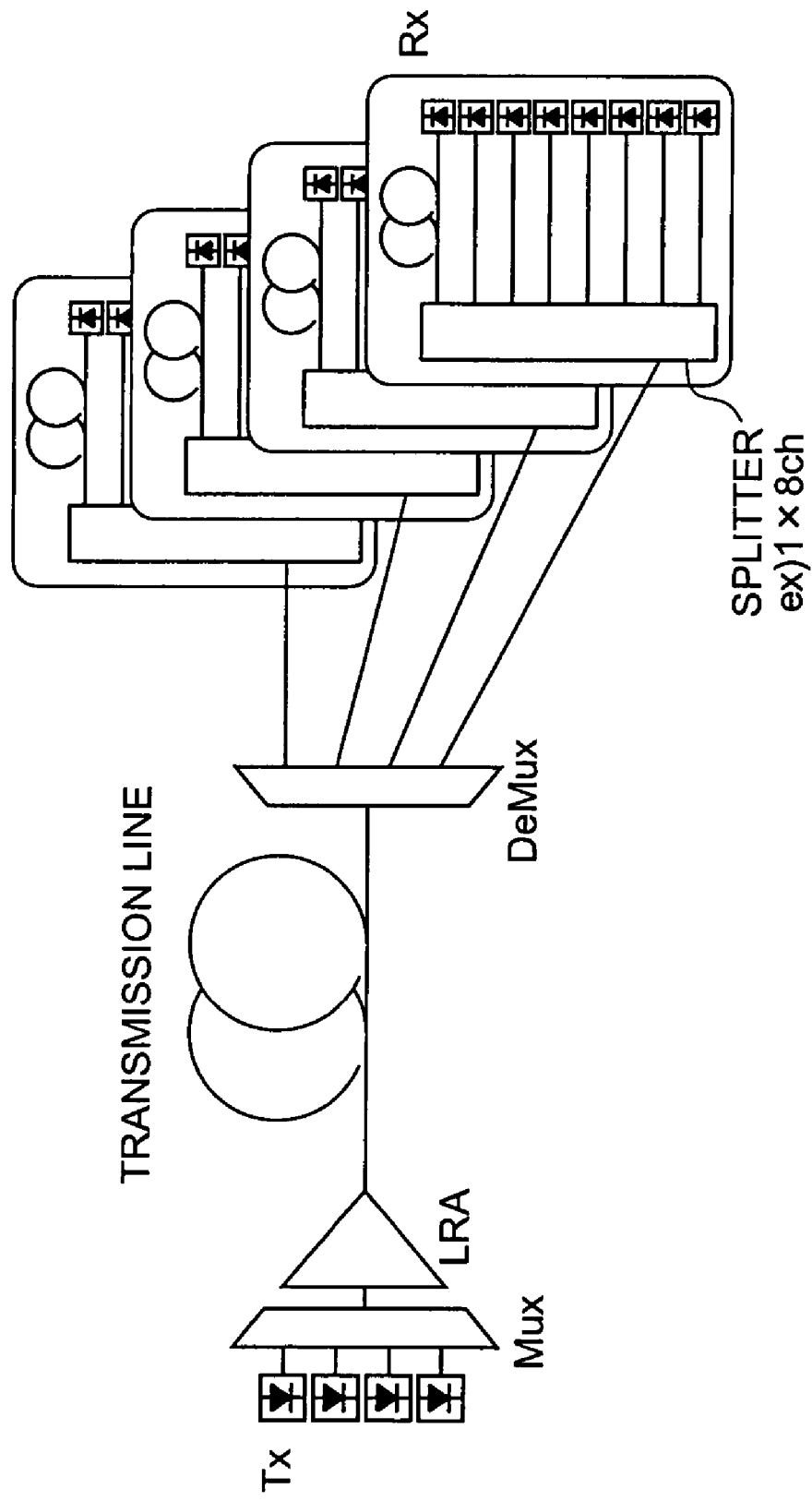
FIG. 26 is a view showing the arrangement of an optical transmission system according to a sixth application of the present invention.

FIG. 26 is a view showing the arrangement of an optical transmission system according to a sixth application of the present invention. The optical transmission system according to the sixth application, as in the case of the optical transmission system according to the above first application, is a system for loss compensation of optical devices. This optical transmission system in which a 1×8 channel optical splitter is used can be applied to Broadcast service dividing one signal light into eight channels, and the like.

(Seventh Application)

Figure 27:
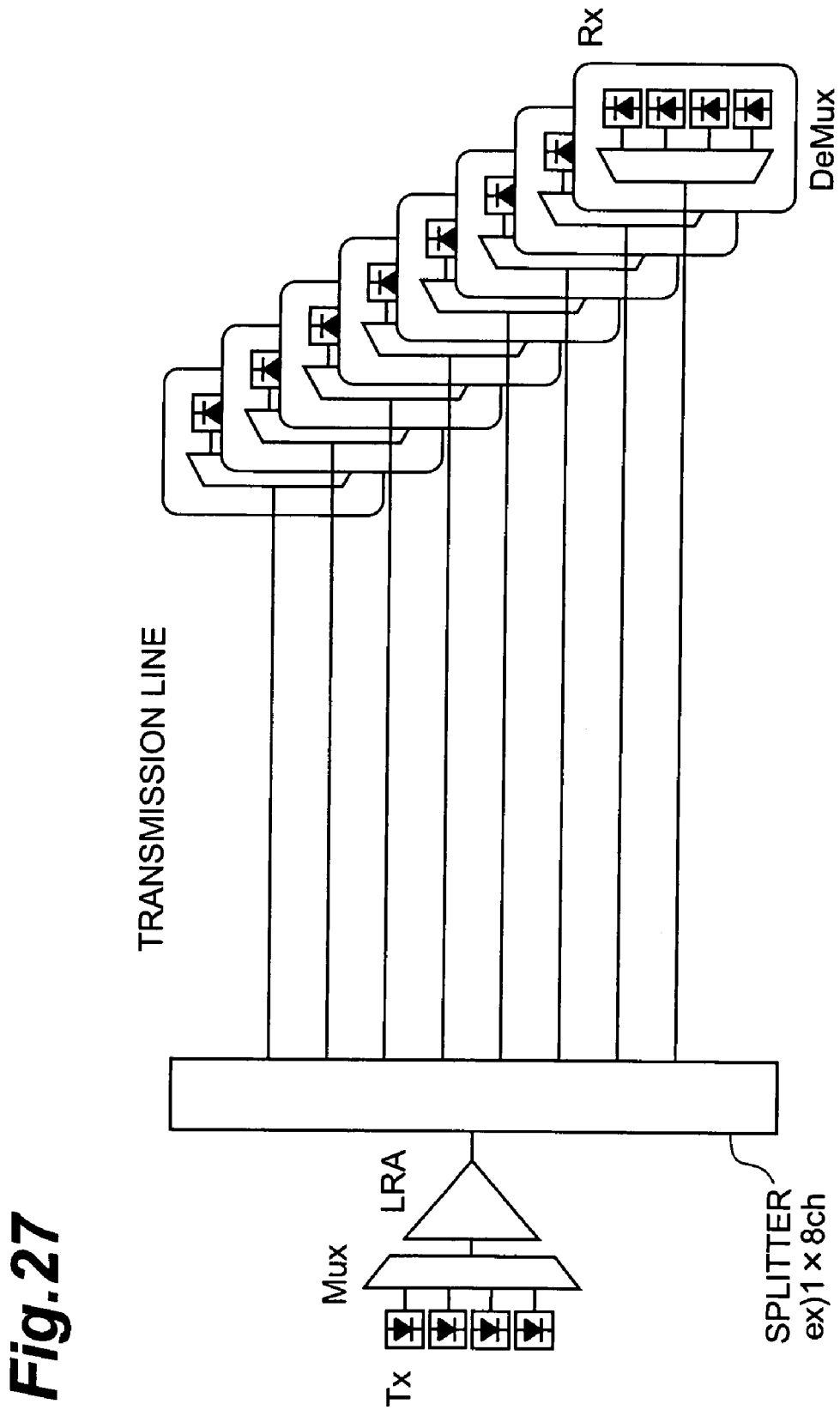
FIG. 27 is a view showing the arrangement of an optical transmission system according to a seventh application of the present invention.

FIG. 27 is a view showing the arrangement of an optical transmission system according to a seventh application of the present invention. The optical transmission system according to the seventh application, as in the case of the optical transmission system according to the above sixth application, is also a system for loss compensation of optical devices. This optical transmission system in which a 1×8 channel optical splitter is used can be also applied to Broadcast service dividing one signal light into eight channels, and the like. In the optical transmission system according to the seventh application, an optical division of the optical splitter is performed at the output end side of the transmitter.

As has been described above, according to the present invention, signal light in which a plurality of signal channels with an optical frequency spacing of 400 GHz or more but 12.5 THz or less are multiplexed is transmitted through an optical fiber transmission line. In addition, SRS means which includes at least part of the optical fiber transmission line and Raman-amplifies the signal light using Raman amplification pumping light is arranged. With this arrangement, in CWDM optical transmission, each of the multiplexed signal channels can be transmitted at a high quality.

Furthermore, when the optical frequency of a pumping channel is set such that the peak of Raman gain is located at an optical frequency different from that of a signal channel, a high gain flatness can be implemented in a wider wavelength band.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical transmission system comprising:
a transmitter outputting signal light in which an optical frequency spacing between the adjacent ones of a plurality of signal channels is 400 GHz or more but 12.5 THz or less;
an optical fiber transmission line transmitting the signal light;
an optical fiber for Raman amplification constituting at least part of said optical fiber transmission line; and
Stimulated-Raman-Scattering means which Raman-amplifies the signal light in said optical fiber for Raman amplification, by supplying Raman amplification pumping light,
wherein said Stimulated-Raman-Scattering means includes a pumping light source outputting the Raman amplification pumping light which includes a plurality of pumping channels, the plurality of pumping channels having wavelengths different from those of the plurality of signal channels, at least a part of the plurality of pumping channels being located between predetermined Raman gain peaks.

2. A system according to claim 1, wherein said transmitter includes a directly-modulation laser, and
wherein said optical fiber for Raman amplification has a negative chromatic dispersion at each signal channel.

3. A system comprising:
a transmitter outputting signal light in which an optical frequency spacing between the adjacent ones of a plurality of signal channels is 400 GHz or more but 12.5 THz or less;
an optical fiber transmission line transmitting the signal light;
an optical fiber for Raman amplification constituting at least part of said optical fiber transmission line; and
Stimulated-Raman-Scattering means which Raman-amplifies the signal light in said optical fiber for Raman amplification, by supplying Raman amplification pumping light,
wherein said Stimulated-Raman-Scattering means includes a Pumping light source outputting the Raman amplification pumping light which includes a plurality of pumping channels,
wherein a nonlinear refractive index of said optical fiber for Raman amplification does not become lower than $3.5 \times 10^{-20}$ [m$^2$/W].

4. An optical transmission system comprising:
a transmitter outputting signal light in which an optical frequency spacing between the adjacent ones of a plurality of signal channels is 400 GHz or more but 12.5 THz or less;
an optical fiber transmission line transmitting the signal light; and Stimulated-Raman-Scattering means which includes at least part of said optical fiber transmission line as an optical fiber for Raman amplification constituting at least part of said optical fiber transmission line, which includes a pumping light source which supplies Raman amplification pumping light containing two or more pumping channels multiplexed to said optical fiber transmission line, and which Raman-amplifies the signal light by supplying the Raman amplification pumping light,
wherein said pumping light source outputs the Raman amplification Pumping light in which an optical frequency of each pumping channel is so set as to locate a peak of Raman gain at an optical frequency different from an optical frequency of each signal channel contained in the signal light,
an optical frequency spacing between the adjacent pumping channels in the Raman amplification pumping light being not less than 4680 GHz, at least one of pumping channels in the Raman amplification pumping light containing a plurality of longitudinal modes.

5. A system according to claim 4, wherein said transmitter includes a directly-modulation laser, and
wherein said optical fiber for Raman amplification has a negative chromatic dispersion at each signal channel.

6. A system according to claim 4, wherein, of said optical fiber transmission line, at least a transmission line section functioning as said optical fiber for Raman amplification has a negative chromatic dispersion at each signal channel.

7. A system comprising:
a transmitter outputting signal light in which an optical frequency spacing between the adjacent ones of a plurality of signal channels is 400 GHz or more but 12.5 THz or less;
an optical fiber transmission line transmitting the signal light; and
Stimulated-Raman-Scattering means which includes at least part of said optical fiber transmission line as an optical fiber for Raman amplification constituting at least part of said optical fiber transmission line, which includes a pumping light source which supplies Raman amplification pumping light containing two or more pumping channels multiplexed to said optical fiber transmission line, and which Raman-amplifies the signal light by supplying the Raman amplification pumping light,
wherein said pumping light source outputs the Raman amplification pumping light in which an optical frequency of each pumping channel is so set as to locate a peak of Raman gain at an optical frequency different from an optical frequency of each signal channel contained in the signal light, an optical frequency spacing between the adjacent pumping channels in the Raman amplification pumping light being not less than 4,680 GHz.
wherein a nonlinear refractive index of said optical fiber for Raman amplification does not become lower than $3.5 \times 10^{-20}$ [m$^2$/W].

8. A system comprising:
a transmitter outputting signal light in which an optical frequency spacing between the adjacent ones of a plurality of signal channels is 400 GHz or more but 12.5 THz or less;

an optical fiber transmission line transmitting the signal light; and

Stimulated-Raman-Scattering means which includes at least part of said optical fiber transmission line as an optical fiber for Raman amplification constituting at least part of said optical fiber transmission line, which includes a pumping light source which supplies Raman amplification pumping light containing two or more pumping channels multiplexed to said optical fiber transmission line, and which Raman-amplifies the signal light by supplying the Raman amplification pumping light, wherein said pumping light source outputs the Raman amplification pumping light in which an optical frequency of each pumping channel is so set as to locate a peak of Raman gain at an optical frequency different from an optical frequency of each signal channel contained in the signal light, an optical frequency spacing between the adjacent pumping channels in the Raman amplification pumping light being not less than 4,680 GHz, wherein let m be the number of pumping channels of the pumping light, and n be the number of signal channels of the signal light, the number of pumping channels and the number of signal channels satisfy the following relation:

$m \leq n/2$.

9. A system comprising:

a transmitter outputting signal light in which an optical frequency spacing between the adjacent ones of a plurality of signal channels is 400 GHz or more but 12.5 THz or less;

an optical fiber transmission line transmitting the signal light; and

Stimulated-Raman-Scattering means which includes at least part of said optical fiber transmission line as an optical fiber for Raman amplification constituting at least part of said optical fiber transmission line, which includes a pumping light source which supplies Raman amplification pumping light containing two or more pumping channels multiplexed to said optical fiber transmission line, and which Raman-amplifies the signal light by supplying the Raman amplification pumping light, wherein said pumping light source outputs the Raman amplification pumping light in which an optical frequency of each pumping channel is so set as to locate a peak of Raman gain at an optical frequency different from an optical frequency of each signal channel contained in the signal light, an optical frequency spacing between the adjacent pumping channels in the Raman amplification pumping light being not less than 4,680 GHz, wherein let m be the number of pumping channels of the pumping light, and n be the number of signal channels of the signal light, the number of pumping channels and the number of signal channels satisfy the following relation:

$m \leq (n+4)/2$.

10. A system comprising:

a transmitter outputting signal light in which an optical frequency spacing between the adjacent ones of a plurality of signal channels is 400 GHz or more but 12.5 THz or less;

an optical fiber transmission line transmitting the signal light; and

Stimulated-Raman-Scattering means which includes at least part of said optical fiber transmission line as an optical fiber for Raman amplification constituting at least part of said optical fiber transmission line, which includes a pumping light source which supplies Raman amplification pumping light containing two or more pumping channels multiplexed to said optical fiber transmission line, and which Raman-amplifies the signal light by supplying the Raman amplification pumping light, wherein said pumping light source outputs the Raman amplification pumping light in which an optical frequency of each pumping channel is so set as to locate a peak of Raman gain at an optical frequency different from an optical frequency of each signal channel contained in the signal light, an optical frequency spacing between the adjacent pumping channels in the Raman amplification pumping light being not less than 4,680 GHz, wherein said optical fiber for Raman amplification has the value $MPI_{crosstalk}$ of 30 dB or less.

11. An optical transmission system comprising:

a transmitter outputting signal light in which an optical frequency spacing between the adjacent ones of a plurality of signal channels is 400 GHz or more but 12.5 THz or less;

an optical fiber transmission line transmitting the signal light;

an optical fiber for Raman amplification constituting at least part of said optical fiber transmission line; and Stimulated-Raman-Scattering means which Raman-amplifies the signal light in said optical fiber amplification, by supplying Raman amplification pumping light, wherein said Stimulated-Raman-cattering means includes a Pumping light source outputting the Raman amplification pumping light which includes a plurality of pumping channels, and at least one of the pumping channels in the Raman amplification pumping light containing a plurality of longitudinal modes.

12. A system according to claim 11, wherein said transmitter includes a directly-modulation laser, and wherein said optical fiber for Raman amplification has a negative chromatic dispersion at each signal channel.

13. An optical transmission system comprising:

a transmitter outputting signal light in which a plurality of signal channels with an optical frequency spacing of 400 GHz or more but 12.5 THz or less are multiplexed;

an optical fiber transmission line transmitting the signal light;

an optical fiber for Raman amplification constituting at least part of said optical fiber transmission line; and Stimulated-Raman-Scattering means which Raman-amplifies the signal light in said optical fiber for Raman amplification, by supplying Raman amplification pumping light, wherein said Stimulated-Raman-Scattering means includes a pumping light source outputting the Raman amplification pumping light which includes a plurality of pumping channels, the wavelengths of the plurality of pumping channels being set such that the plurality of signal channels are located away from the Raman gain peak wavelength by 624 GHz to 1246 GHz.

* * * * *